(12) United States Patent
Saito et al.

(10) Patent No.: US 11,787,156 B2
(45) Date of Patent: *Oct. 17, 2023

(54) COATED STEEL MATERIAL

(71) Applicant: NIPPON STEEL CORPORATION, Tokyo (JP)

(72) Inventors: Mamoru Saito, Tokyo (JP); Yasuto Goto, Tokyo (JP); Kiyokazu Ishizuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/771,012

(22) PCT Filed: Oct. 16, 2020

(86) PCT No.: PCT/JP2020/039183
§ 371 (c)(1),
(2) Date: Apr. 22, 2022

(87) PCT Pub. No.: WO2021/095442
PCT Pub. Date: May 20, 2021

(65) Prior Publication Data
US 2022/0371302 A1 Nov. 24, 2022

(30) Foreign Application Priority Data
Nov. 14, 2019 (JP) .................................. 2019-205998

(51) Int. Cl.
*B32B 15/01* (2006.01)
*C22C 18/04* (2006.01)
(Continued)

(52) U.S. Cl.
CPC ............ *B32B 15/013* (2013.01); *B32B 15/04* (2013.01); *B32B 15/043* (2013.01); *B32B 15/18* (2013.01);
(Continued)

(58) Field of Classification Search
CPC ..... B32B 15/013; B32B 15/04; B32B 15/043; B32B 15/18; C22C 18/00; C22C 18/04;
(Continued)

(56) References Cited

U.S. PATENT DOCUMENTS

| 6,465,114 B1 | 10/2002 | Honda et al. |
| 2019/0390303 A1 | 12/2019 | Tokuda et al. |

(Continued)

FOREIGN PATENT DOCUMENTS

| EP | 3575433 A1 | 12/2019 |
| JP | 2001-355053 A | 12/2001 |

(Continued)

OTHER PUBLICATIONS

Machine Translation, Saito, et al., WO 2019/221193 A1, Nov. 2019. (Year: 2019).*

*Primary Examiner* — Michael E. La Villa
(74) *Attorney, Agent, or Firm* — SOLARIS Intellectual Property Group, PLLC

(57) ABSTRACT

A coated steel material including: a base steel, and a coating layer containing a Zn—Al—Mg alloy layer disposed on a surface of the base steel, wherein the coating layer has a predetermined chemical composition, and, in a backscattered electron image of the Zn—Al—Mg alloy layer that is obtained at a time of observing the surface of the Zn—Al—Mg alloy layer after polishing to ½ of the layer thickness, under a scanning electron microscope at a magnification of (Continued)

100×, Al crystals are present, and the average value of the cumulative circumferential length of the Al crystals is 88 to 195 mm/mm$^2$.

4 Claims, 4 Drawing Sheets

(51) Int. Cl.
    *C23C 2/06*     (2006.01)
    *C23C 2/40*     (2006.01)
    *C23C 28/02*     (2006.01)
    *C23C 2/02*     (2006.01)
    *C23C 2/26*     (2006.01)
    *C23C 2/28*     (2006.01)
    *C23C 30/00*     (2006.01)
    *C22C 18/00*     (2006.01)
    *B32B 15/18*     (2006.01)
    *C23C 28/00*     (2006.01)
    *B32B 15/04*     (2006.01)

(52) U.S. Cl.
    CPC .............. *C22C 18/00* (2013.01); *C22C 18/04* (2013.01); *C23C 2/02* (2013.01); *C23C 2/024* (2022.08); *C23C 2/0222* (2022.08); *C23C 2/0224* (2022.08); *C23C 2/06* (2013.01); *C23C 2/26* (2013.01); *C23C 2/28* (2013.01); *C23C 2/29* (2022.08); *C23C 2/40* (2013.01); *C23C 28/02* (2013.01); *C23C 28/021* (2013.01); *C23C 28/023* (2013.01); *C23C 28/025* (2013.01); *C23C 28/3225* (2013.01); *C23C 30/00* (2013.01); *C23C 30/005* (2013.01); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
    CPC .... C23C 2/02; C23C 2/06; C23C 2/26; C23C 2/28; C23C 2/40; C23C 28/02; C23C 28/021; C23C 28/023; C23C 28/025; C23C 28/3225; C23C 30/00; C23C 30/005; C23C 2/0222; C23C 2/0224; C23C 2/024; C23C 2/29; Y10T 428/12792; Y10T 428/12799; Y10T 428/12951; Y10T 428/12958; Y10T 428/12972; Y10T 428/12979; Y10T 428/24967; Y10T 428/24975; Y10T 428/263; Y10T 428/264; Y10T 428/265
    See application file for complete search history.

(56) References Cited

U.S. PATENT DOCUMENTS

2021/0079498 A1     3/2021     Mitsunobu
2022/0356547 A1*   11/2022   Tokuda ................... C22C 18/04

FOREIGN PATENT DOCUMENTS

| WO | | 2018/139619 A1 | | 8/2018 |
| WO | | 2018/169084 A1 | | 9/2018 |
| WO | | 2019/221193 A1 | | 11/2019 |
| WO | WO | 2019/221193 A1 | * | 11/2019 |

* cited by examiner

COATED STEEL MATERIAL

TECHNICAL FIELD

The present disclosure relates to a coated steel material.

BACKGROUND ART

A wide variety of coated steel materials are utilized in the field of construction materials for example. Many are Zn coated steel materials. Due to the need for construction materials to have a long life, research on improving the corrosion resistance of Zn coated steel materials has been carried out for a long time, and various coated steel materials have been developed. An initial highly corrosion-resistant coated steel material for construction materials was a Zn-5% Al coated steel material (a Galfan coated steel material) in which Al was added to a Zn-based coating layer and the corrosion resistance was improved. It is a known fact that corrosion resistance is improved by adding Al into the coating layer. By adding 5% Al, Al crystals form in the coating layer (specifically, the Zn phase), and the corrosion resistance improves. A Zn-55% Al-1.6% Si coated steel material (a Galvalume steel material) also is a coated steel material having improved corrosion resistance for basically the same reason.

Accordingly, when the Al concentration is increased, basically, the planar surface corrosion resistance improves. However, an increase in the Al concentration brings about a decrease in the sacrificial corrosion protection ability.

Here, the sacrificial corrosion protection effect with respect to the base steel is an attractive feature of Zn coated steel materials. Namely, at cut edges of the coated steel material, and at cracked portions of the coating layer at the time of processing, and at bared portions of the base steel that appear due to peeling or the like of the coating layer, the coating layer at the periphery elutes before corrosion of the base steel, and the dissolved coating components form a protective film. Due thereto, it is possible to prevent red rust from the base steel to a certain extent.

In general, a lower concentration of Al and higher concentration of Zn are preferable to achieve such an effect. Accordingly, highly corrosion-resistant coated steel materials, in which the Al concentration is suppressed to a relatively low concentration of around 5% to 25% or the like, have been put into practical use in recent years. In particular, coated steel materials, in which the Al concentration is kept low and which also contain Mg in an amount of around 1 to 3%, have planar surface corrosion resistance and a sacrificial corrosion protection ability that are superior to those of Galfan coated steel materials. Therefore, such materials are trending in the market as coated steel materials, and currently are widely known in the market.

The coated steel material disclosed in Patent Document 1 for example also has been developed as a coated steel material containing certain amounts of Al and Mg.

Specifically, Patent Document 1 discloses a hot dip Zn—Al—Mg—Si coated steel material in which 200 or more Al phases exist per 1 mm$^2$ on the surface of a coated steel material having, on the surface of a steel material, a coating layer formed from Al: 5 to 18% by mass, Mg: 1 to 10% by mass, Si: 0.01 to 2% by mass, and the remainder being Zn and unavoidable impurities.

PRIOR ART DOCUMENTS

Patent Documents

Patent Document 1: Japanese Patent Application Laid-Open (JP-A) No. 2001-355053

SUMMARY OF INVENTION

Technical Problem

However, at a coated steel material containing Al in a certain concentration, there is a strong tendency for corrosion of the coating layer (specifically, a Zn—Al—Mg alloy layer) to progress locally and reach the base steel at an early stage. As a result, there are cases in which the planar surface corrosion resistance deteriorates, and there is great dispersion in the planar surface corrosion resistance. Therefore, there is currently the demand for coated steel materials having stable, high planar surface corrosion resistance.

Further, in order to improve the sacrificial corrosion protection ability at the coating layer, a structure that easily dissolves in water (hereinafter also called "water-soluble structure") must be contained. However, a water-soluble structure also dissolves in the water that is moisture in the atmosphere that has condensed on the surface of the coated steel material. Due thereto, there are cases in which the surface of the coated steel material becomes discolored black from the initial stage after manufacturing of the coated steel material.

Thus, a topic of one aspect of the present disclosure is to provide a coated steel material that is highly discoloration-resistant while the planar surface corrosion resistance and sacrificial corrosion protection ability thereof are ensured.

Solution to Problem

The above-described problem is solved by the following means.

<1>
A coated steel material comprising a base steel, and a coating layer containing a Zn—Al—Mg alloy layer disposed on a surface of the base steel,
wherein the coating layer has a chemical composition formed from, in % by mass:
Zn: greater than 65.0%,
Al: greater than 5.0% to less than 25.0%,
Mg: greater than 3.0% to less than 12.5%,
Sn: 0 to 0.20%,
Bi: 0% to less than 5.0%,
In: 0% to less than 2.0%,
Ca: 0% to 3.0%,
Y: 0% to 0.5%,
La: 0% to less than 0.5%,
Ce: 0% to less than 0.5%,
Si: 0% to less than 2.5%,
Cr: 0% to 0.25%,
Ti: 0% to 0.25%,
Ni: 0% to 0.25%,
Co: 0% to 0.25%,
V: 0% to 0.25%,
Nb: 0% to 0.25%,
Cu: 0% to 0.25%,
Mn: 0% to 0.25%,
Fe: 0% to 5.0%,
Sr: 0% to less than 0.5%,
Sb: 0% to less than 0.5%, Pb: 0% to less than 0.5%, B: 0% to less than 0.5%, and impurities, and wherein, in a backscattered electron image of the Zn—Al—Mg alloy layer that is obtained at a time of observing a surface of the Zn—Al—Mg alloy layer after polishing to ½ of a layer thickness, under a scanning electron microscope at a magnification of 100×, Al crystals are present, and an average value of a cumulative circumferential length of the Al crystals is 88 to 195 mm/mm².

<2>

The coated steel material of <1>, wherein a content of the Sn is 0 to less than 0.10%, in % by mass.

<3>

The coated steel material of <1> or <2>, wherein the coating layer has an Al—Fe alloy layer of a thickness of 0.05 to 5 μm, between the base steel and the Zn—Al—Mg alloy layer.

Advantageous Effects of Invention

In accordance with an aspect of the present disclosure, there can be provided a coated steel material that is highly discoloration-resistant while the planar surface corrosion resistance and sacrificial corrosion protection ability thereof are ensured.

DESCRIPTION OF EMBODIMENTS

Figure 1:
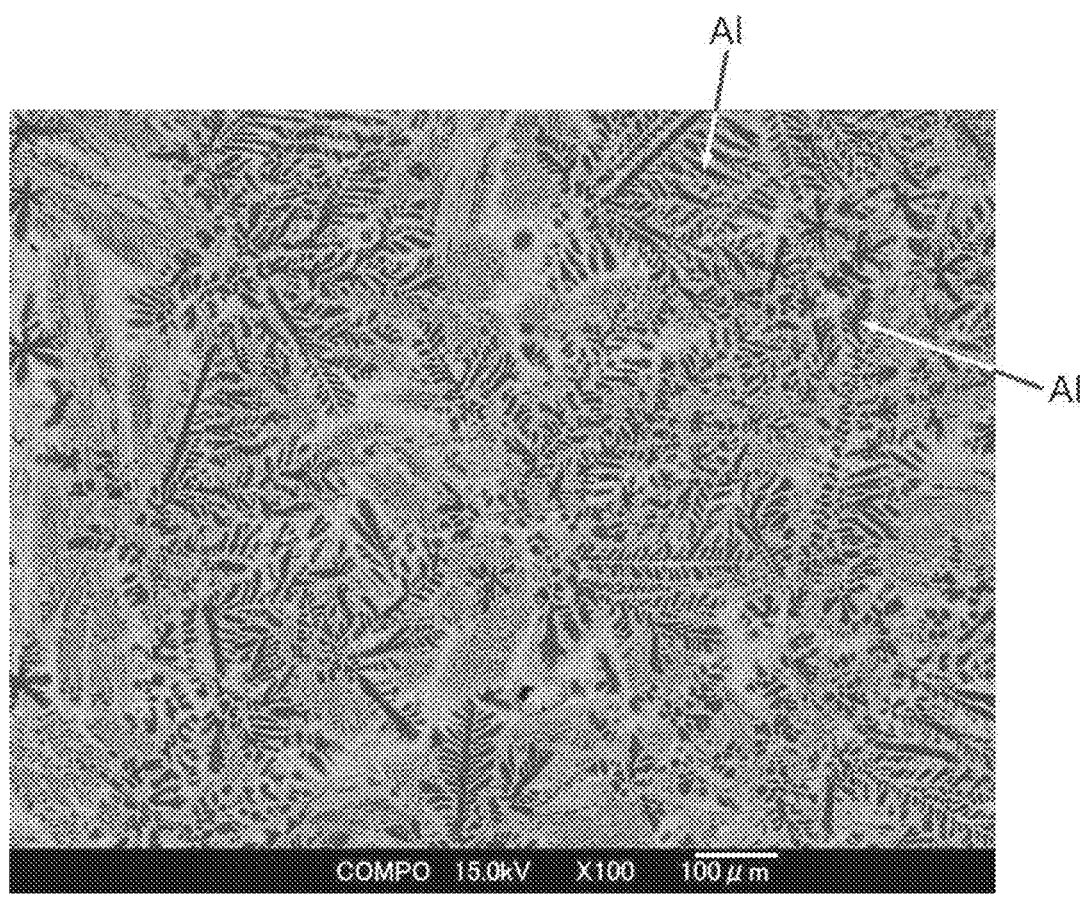
FIG. 1 is an SEM backscattered electron image (at a magnification of 100×) showing an example of a Zn—Al—Mg alloy layer of a coated steel material of the present disclosure.

An example of the present disclosure is described hereinafter.

Note that, in the present disclosure, the "%" expression of the content of each element in a chemical composition means "% by mass".

Numerical ranges expressed by using "to" mean ranges in which the numerical values listed before and after the "to" are included as the lower limit and the upper limit.

Numerical ranges in cases in which "greater than" or "less than" accompanies a numerical value listed before or after the "to" mean ranges that do not include these values as the lower limit or the upper limit.

The content of an element in a chemical composition may be expressed as the concentration of the element (e.g., Zn concentration, Mg concentration, or the like).

The word "process" is not only an independent process, and, provided that the intended purpose of the process is achieved even in a case in which the process cannot be clearly differentiated from other processes, that process is included in this word.

"Planar surface corrosion resistance" means the property of the coating layer (specifically, a Zn—Al—Mg alloy layer) itself being difficult to corrode.

"Sacrificial corrosion protection ability" means the property of suppressing corrosion of the base steel at bared portions of the base steel (e.g., the cut edges of the coated steel material, cracked portions of the coating layer at the time of processing, and places where the base steel is exposed due to peeling of the coating layer).

"Discoloration resistance" means the property of the surface of the coated steel material (e.g., the surface of the coating layer) being difficult to become discolored to black, after manufacturing of the coated steel material.

The coated steel material of the present disclosure is a coated steel material having a base steel, and a coating layer that is disposed on the surface of the base steel and contains a Zn—Al—Mg alloy layer.

Further, at the coated steel material of the present disclosure, the coating layer has a predetermined chemical composition, and, in a backscattered electron image of the Zn—Al—Mg alloy layer that is obtained at a time of observing the surface of the Zn—Al—Mg alloy layer after polishing to ½ of the layer thickness, under a scanning electron microscope at a magnification of 100×, Al crystals are present, and the average value of the cumulative circumferential length of the Al crystals is 88 to 195 mm/mm².

Owing to the above-described structure, the coated steel material of the present disclosure is a coated steel material that is highly discoloration-resistant while the planar surface corrosion resistance and sacrificial corrosion protection ability thereof are ensured. The coated steel material of the present disclosure was discovered from the following information.

The present inventors analyzed the initial corrosion behavior of a coating layer that contained a Zn—Al—Mg alloy layer. As a result, it was found that corrosion of the coating layer (specifically, a Zn—Al—Mg alloy layer) progresses locally in the shape of an ants' nest, and the peripheries of the Al crystals are corroded first.

This is assumed to be as follows. Potential difference corrosion occurs between Al crystals whose potential is high and the structures at the periphery whose potential is low, relatively.

Therefore, the greater the contact surface area between the Al crystals and the phases at the peripheries of the Al crystals, the easier it is for corrosion of the peripheries of the Al crystals to occur, and therefore, the planar surface corrosion resistance deteriorates, and the dispersion in the planar surface corrosion resistance also becomes large.

Thus, the present inventors conceived of the idea of, in order to greatly decrease the contact surface area between the Al crystals and the phases at the peripheries of the Al crystals, controlling the cooling conditions after immersion in the coating bath at the time of manufacturing the coating layer, and coarsely precipitating the Al crystals.

As a result, the following was discovered. The Al crystal cumulative circumferential length, which is obtained by image analysis as an index of the size of the Al crystals, and the planar surface corrosion resistance correlate well. Further, when the average value of the cumulative circumferential length of the Al crystals is set in a predetermined range, the contact surface area between the Al crystals and the phases at the peripheries of the Al crystals is reduced. As a result, the peripheries of the Al crystals corroding first is suppressed, and stable planar surface corrosion resistance is obtained. However, if the average value of the cumulative circumferential length of the Al crystals is lowered excessively, processability deteriorates.

On the other hand, the present inventors studied the content of Sn that improves sacrificial corrosion protection ability, and obtained the following knowledge.

If Sn is contained in a coating layer in an amount greater than 0.20% in order to improve the sacrificial corrosion protection ability, an $Mg_2Sn$ phase that is a water-soluble structure is generated. However, an $Mg_2Sn$ phase that is a water-soluble structure also dissolves in the water that is moisture in the atmosphere that has condensed on the surface of the coated steel material. Due thereto, after manufacturing of the coated steel material, there are cases in which the surface of the coated steel material becomes discolored black over time.

Thus, by keeping the content of Sn to 0 to 0.20%, excessive generation of an $Mg_2Sn$ phase that is a water-soluble structure is suppressed. Due thereto, the sacrificial corrosion protection ability together with the planar surface corrosion resistance are ensured, and in addition, the discoloration resistance improves.

From the above, it was found that the coated steel material of the present disclosure is a coated steel material that is highly discoloration-resistant while the planar surface corrosion resistance and sacrificial corrosion protection ability thereof are ensured.

Details of the coated steel material of the present disclosure are described hereinafter.

The shape of the base steel is not particularly limited. Examples of the base steel include, in addition to steel sheets, shaped-processed base steel such as steel pipes, engineering and construction materials (fence beams, corrugated pipes, drain ditch covers, sand drift preventing coates, bolts, wire mesh, guard rails, cut-off walls, and the like), electrical home appliance members (housings for outdoor air conditioner units, and the like), automotive parts (undercarriage members and the like), and the like. Various plastic working methods such as, for example, press working, roll forming, bending, or the like can be used as the shaping processing.

The material of the base steel is not particularly limited. Various base steels such as, for example, general steel, pre-coated steel, Al killed steel, ultra-low carbon steel, high carbon steel, various high tensile strength steels, some high alloy steels (steel containing a strengthening element such as Ni, Cr or the like) and the like can be used as the base steel. For the base steel, the conditions of the method of manufacturing the base steel, the method of manufacturing a base steel sheet (hot rolling method, pickling method, cold rolling method, and the like), and the like also are not particularly limited.

Note that the hot-rolled steel sheet, hot-rolled steel strip, cold-rolled steel sheet, and cold-rolled steel strip that are described in JIS G 3302 (2010) also can be used as the base steel.

The base steel may be a pre-coated steel material that has been pre-coated. The pre-coated steel material is obtained by an electrolytic treatment method or a displacement coating method for example. In an electrolytic treatment method, a pre-coated steel material is obtained by immersing the base steel in a sulfate bath or a chloride bath containing metal ions of various pre-coating components, and carrying out an electrolytic treatment. In a displacement coating method, a pre-coated steel material is obtained by immersing the base steel in an aqueous solution that contains metal ions of various pre-coating components and whose pH has been adjusted by sulfuric acid, and causing displacement precipitation of the metals.

An Ni pre-coated steel material is a representative example of a pre-coated steel material.

The coating layer is described next.

The coating layer includes a Zn—Al—Mg alloy layer. In addition to the Zn—Al—Mg alloy layer, the coating layer may include an Al—Fe alloy layer. The Al—Fe alloy layer exists between the base steel and the Zn—Al—Mg alloy layer.

Namely, the coating layer may be a single-layer structure of a Zn—Al—Mg alloy layer, or may be a multilayer structure that includes a Zn—Al—Mg alloy layer and an Al—Fe alloy layer. In the case of a multilayer structure, it is good for the Zn—Al—Mg alloy layer to be the layer that structures the surface of the coating layer.

However, an oxide film of the coating layer structural elements is formed to around 50 nm on the surface of the coating layer, but the thickness thereof is thin as compared with the thickness of the entire coating layer, and the oxide film is not considered as structuring a main constituent of the coating layer.

Here, the thickness of the Zn—Al—Mg alloy layer is made to be, for example, 2 μm or more and 95 μm or less (preferably, 5 μm or more and 75 μm or less).

On the other hand, the thickness of the entire coating layer is, for example, around 100 μm or less. Because the thickness of the entire coating layer depends on the coating conditions, the upper limit and the lower limit of the thickness of the entire coating layer are not particularly limited. For example, the thickness of the entire coating layer is related to the viscosity and specific gravity of the coating bath in a usual hot dip coating method.

Moreover, the coated amount is quantitatively adjusted by the drawing speed of the base steel and the intensity of the wiping. Therefore, it can be thought that the lower limit of the thickness of the entire coating layer is around 2 μm.

On the other hand, due to the own weight and uniformity of the coating metal, the upper limit of the thickness of the coating layer that can be manufactured by a hot dip coating method is around 95 μm.

Because the thickness of the coating layer can be freely changed by the drawing speed from the coating bath and the wiping conditions, it is not particular difficult to manufacture a coating layer of a thickness of 2 to 95 μm.

The deposited amount of the coating layer is preferably 20 to 300 $g/m^2$ on one surface.

If the deposited amount of the coating layer is 20 $g/m^2$ or more, the planar surface corrosion resistance and sacrificial corrosion protection ability can be ensured more reliably. On the other hand, if the deposited amount of the coating layer is 300 $g/m^2$ or less, defects in the external appearance, such as a pattern of sagging or the like, of the coating layer can be suppressed.

The Al—Fe alloy layer is described next.

The Al—Fe alloy layer is formed on the surface of the base steel (specifically, between the base steel and the Zn—Al—Mg alloy layer), and is a layer having a structure in which an $Al_5Fe$ phase is a main phase. The Al—Fe alloy layer is formed by the atomic diffusion between the base steel and the coating bath. When a hot dip coating method is used as the manufacturing method, the Al—Fe alloy layer is easily formed in a coating layer that contains the element Al. Because Al is contained in coating bath at a certain concentration or higher, the $Al_5Fe$ phase is the phase that is formed most. However, the atomic diffusion takes time, and, at the portion near the base steel, there are also portions where the Fe concentration is high. Therefore, there are also cases in which the Al—Fe alloy layer partially contains small amounts of an AlFe phase, an $Al_3Fe$ phase, an $Al_5Fe_2$ phase, or the like. Further, because Zn also is contained in the coating bath at a certain concentration, the Al—Fe alloy layer also contains a small amount of Zn.

With regard to the corrosion resistance, there is no great difference among any of the $Al_5Fe$ phase, $Al_3Fe$ phases, AlFe phase and $Al_5Fe_2$ phase. What is called corrosion resistance here is the corrosion resistance at a portion that is not affected by welding.

Here, in a case in which Si is contained in the coating layer, it is easy for the Si to be taken into the Al—Fe alloy layer in particular, and there are cases in which an Al—Fe—Si intermetallic compound phase is formed. Intermetallic compound phases that are identified include AlFeSi phases, and $\alpha$, $\beta$, q1, q2-AlFeSi phases and the like exist as isomers. Therefore, there are cases in which these AlFeSi phases and the like are detected in the Al—Fe alloy layer. An Al—Fe alloy layer that includes such AlFeSi phases or the like is also called an Al—Fe—Si alloy layer.

Note that, because the thickness of the Al—Fe—Si alloy layer as well is small relative to the Zn—Al—Mg alloy layer, the effect on the corrosion resistance of the overall coating layer is small.

Further, in a case in which any of various pre-coated steel materials is used for the base steel (a base steel sheet or the like), there are cases in which the structure of the Al—Fe alloy layer changes due to the deposited amount of the pre-coating. Specifically, there are cases in which a pure metal layer that was used for pre-coating remains at the periphery of the Al—Fe alloy layer, cases in which an intermetallic compound phase (for example, an $Al_3Ni$ phase or the like), in which the structural components of the Zn—Al—Mg alloy layer and the pre-coating components have bonded together, forms an alloy layer, cases in which an Al—Fe alloy layer, in which some Al atoms and Fe atoms are substituted, is formed, cases in which an Al—Fe—Si alloy layer, in which some Al atoms, Fe atoms and Si atoms are substituted, is formed, and the like. In all of these cases, the thickness of these alloy layers is small as compared with the Zn—Al—Mg alloy layer, and therefore, the effect on the corrosion resistance at the coating layer overall is small.

Namely, an Al—Fe alloy layer is a layer that encompasses alloy layers of the above-described various forms, except for alloy layers whose main constituent is an $Al_5Fe$ phase.

Note that, in a case in which a coating layer is formed on an Ni pre-coated steel material among various types of pre-coated steel materials, an Al—Ni—Fe alloy layer is formed as the Al—Fe alloy layer. Because the thickness of an Al—Ni—Fe alloy layer as well is small as compared with the Zn—Al—Mg alloy layer, the effect on the corrosion resistance at the coating layer overall is small.

The thickness of the Al—Fe alloy layer is, for example, 0 µm or more and 5 µm or less.

Namely, the Al—Fe alloy layer does not have to be formed. From the standpoints of increasing the adhesion of the coating layer (specifically, the Zn—Al—Mg alloy layer) and ensuring the processability, the thickness of the Al—Fe alloy layer is preferably 0.05 µm or more and 5 µm or less.

However, when a coating layer of the chemical composition that is prescribed in the present disclosure is formed by a usual hot dip coating method, it is often the case that an Al—Fe alloy layer of 100 nm or more forms between the base steel and the Zn—Al—Mg alloy layer. The lower limit of the thickness of the Al—Fe alloy layer is not particularly limited, and it is known that an Al—Fe alloy layer inevitably forms at the time of forming a hot dip coating layer that contains Al. Further, empirically, it is considered that a thickness of around 100 nm is the thickness at which formation of an Al—Fe alloy layer is most suppressed, and the adhesion between the coating layer and the base steel can be sufficiently ensured. Because the Al concentration is high unless special measures are taken, in the hot dip coating method, it is difficult to form an Al—Fe alloy layer that is thinner than 100 nm. However, even if the thickness of the Al—Fe alloy layer is less than 100 nm, or even if an Al—Fe alloy layer is not formed, it is assumed that there is no great effect on the coating performance.

On the other hand, if the thickness of the Al—Fe alloy layer is greater than 5 µm, the Al component of the Zn—Al—Mg alloy layer that is formed on the Al—Fe alloy layer is insufficient, and moreover, there is the tendency for the adhesion and the processability of the coating layer to deteriorate greatly. Therefore, limiting the thickness of the Al—Fe alloy layer to 5 µm or less is preferable.

Note that the Al—Fe alloy layer is closely related also to the Al concentration and the Sn concentration, and generally, with a higher Al concentration and Sn concentration, the growth rate tends to increase.

Because it is often the case that an Al—Fe alloy layer has an $Al_5Fe$ phase as a main structure thereof, a composition containing Fe: 25 to 35%, Al: 65 to 75%, Zn: 5% or less, and the remainder: impurities, can be given as an example of the chemical composition of the Al—Fe alloy layer.

Usually, the thickness of a Zn—Al—Mg alloy layer is thicker than that of an Al—Fe alloy layer. Therefore, the contribution of an Al—Fe alloy layer as a coated steel material to the planar surface corrosion resistance is small as compared with an Zn—Al—Mg alloy layer. However, an Al—Fe alloy layer contains Al and Zn, which are corrosion-resistant elements, at certain concentrations or more, as is surmised from results of component analyses.

Therefore, the Al—Fe alloy layer has sacrificial corrosion protection ability and a corrosion barrier effect of a certain extent with respect to the base steel.

Here, it is difficult to confirm, by quantitative measurement, the contribution that a thin Al—Fe alloy layer alone makes to the corrosion resistance. However, for example, in a case in which the Al—Fe alloy layer has a sufficient thickness, it is possible to evaluate the corrosion resistance of the Al—Fe alloy layer alone by precisely removing the Zn—Al—Mg alloy layer that is on the Al—Fe alloy layer from the surface of the coating layer by cutting by end milling or the like and performing a corrosion test. Because an Al—Fe alloy layer contains an Al component and a small amount of a Zn component, when there is an Al—Fe alloy layer, red rust arises in the form of dots, but the entire surface does not become red rust as in a case in which there is no Al—Fe alloy layer and the base steel peels-off.

Further, when a cross-section of the coating layer, which has reached a stage immediately before red rust formation on the base steel, is observed during a corrosion test, it can be confirmed that, even if the Zn—Al—Mg alloy layer that is the upper layer elutes and rusts, is dissolved and rusts, only the Al—Fe alloy layer remains, and prevents corrosion of the base steel. This is because the Al—Fe alloy layer is electrochemically nobler than the Zn—Al—Mg layer but less noble than the base steel. From these facts, it can be judged that the Al—Fe alloy layer also has a certain level of corrosion resistance.

From the standpoint of corrosion, the thicker the Al—Fe alloy layer, the more preferable, and there is the effect of delaying the red rust formation time. However, because a thick Al—Fe alloy layer is a cause of significant deterioration of the coating processability, the thickness is preferably less than or equal to a certain thickness. From the standpoint of processability, the thickness of the Al—Fe alloy layer is preferably 5 µm or less. If the thickness of the Al—Fe alloy layer is 5 µm or less, according to a V-bending test and the like, the cracks that arise with the coated Al—Fe alloy layer being the starting points thereof, and the amount of powdering, are reduced. The thickness of the Al—Fe alloy layer is more preferably 2 µm or less.

The chemical composition of the coating layer is described next.

With respect to the composition of the components of the Zn—Al—Mg alloy layer that is contained in the coating layer, the composition ratio of the components in the coating bath is substantially maintained even in the Zn—Al—Mg alloy layer. In a hot dip coating method, the reaction by which the Al—Fe alloy layer is formed is completed in the coating bath, and therefore, the decreases in the Al component and the Zn component in the Zn—Al—Mg alloy layer due to the formation of the Al—Fe alloy layer are usually slight.

Further, in order to realize stable planar surface corrosion resistance, the chemical composition of the coating layer is made to be as follows.

Namely, the chemical composition of the coating layer is a chemical composition formed from, in % by mass:
Zn: greater than 65.0%,
Al: greater than 5.0% to less than 25.0%,
Mg: greater than 3.0% to less than 12.5%,
Sn: 0 to 0.20%,
Bi: 0% to less than 5.0%,
In: 0% to less than 2.0%,
Ca: 0% to 3.0%,
Y: 0% to 0.5%,
La: 0% to less than 0.5%,
Ce: 0% to less than 0.5%,
Si: 0% to less than 2.5%,
Cr: 0% to 0.25%,
Ti: 0% to 0.25%,
Ni: 0% to 0.25%,
Co: 0% to 0.25%,
V: 0% to 0.25%,
Nb: 0% to 0.25%,
Cu: 0% to 0.25%,
Mn: 0% to 0.25%,
Fe: 0% to 5.0%,
Sr: 0% to less than 0.5%,
Sb: 0% to less than 0.5%,
Pb: 0% to less than 0.5%,
B: 0% to less than 0.5%, and
impurities.

In the chemical composition of the coating layer, Bi, In, Ca, Y, La, Ce, Si, Cr, Ti, Ni, Co, V, Nb, Cu, Mn, Fe, Sr, Sb, Pb and B are optional components. Namely, these elements need not be contained in the coating layer. When any of these optional components are contained, the content of the optional element is preferably in the range described hereinafter.

Here, the chemical composition of this coating layer is the average chemical composition of the entire coating layer (the average chemical composition of the Zn—Al—Mg alloy layer in a case in which the coating layer is a single-layer structure of a Zn—Al—Mg alloy layer, and the average chemical composition of the total of the Al—Fe alloy layer and the Zn—Al—Mg alloy layer in a case in which the coating layer is a multilayer structure of an Al—Fe alloy layer and a Zn—Al—Mg alloy layer).

Usually, in a hot dip coating method, it is almost always the case that the coating layer formation reaction is completed within the coating bath, and therefore, the chemical composition of the Zn—Al—Mg alloy layer is substantially equivalent to the chemical composition of the coating bath. Further, in a hot dip coating method, the Al—Fe alloy layer instantaneously forms and grows immediately after immersion in the coating bath. Further, the formation reaction of the Al—Fe alloy layer is completed in the coating bath, and it is usually the case that the thickness thereof also is sufficiently small as compared with the Zn—Al—Mg alloy layer.

Accordingly, unless a special heat treatment such as a heating alloying treatment or the like is conducted after the coating, the average chemical composition of the entire coating layer is substantially equivalent to the chemical composition of the Zn—Al—Mg alloy layer, and the components of the Al—Fe alloy layer can be ignored.

The respective elements of the coating layer are described hereinafter.

<Zn: Greater than 65.0%>

Zn is an element that is needed in order to obtain sacrificial corrosion protection ability, in addition to planar surface corrosion resistance. With regard to the Zn concentration, when considered in an atomic composition ratio, Zn must be made to be a main constituent in terms of the atomic composition ratio as well because the coating layer is structured also by elements of a low specific gravity such as Al, Mg and the like.

Accordingly, the Zn concentration is greater than 65.0%. The Zn concentration is preferably 70% or more. Note that the upper limit of the Zn concentration is the concentration that is the remainder that is other than the impurities and the elements other than Zn.

<Al: Greater than 5.0% to Less than 25.0%>

Al is an essential element for forming Al crystals and ensuring both planar surface corrosion resistance and sacrificial corrosion protection ability. Further, Al is an essential element also for improving the adhesion of the coating layer and ensuring the processability.

Accordingly, the lower limit of the Al concentration is made to be greater than 5.0% (preferably 10.0% or more).

On the other hand, when the Al concentration increases, the sacrificial corrosion protection ability tends to deteriorate. Accordingly, the upper limit of the Al concentration made to be less than 25.0% (preferably 23.0% or less).

<Mg: Greater than 3.0% to Less than 12.5%>

Mg is an essential element for ensuring both planar surface corrosion resistance and sacrificial corrosion protection ability. Accordingly, the lower limit of the Mg concentration is made to be greater than 3.0% (preferably greater than 5.0%). On the other hand, when the Mg concentration increases, the processability tends to deteriorate. Accordingly, the upper limit of the Mg concentration is made to be less than 12.5% (preferably 10.0% or less).

<Sn: 0 to 0.20%>

Sn is an element that generates an $Mg_2Sn$ phase that is a water-soluble structure, and imparts a high sacrificial corrosion protection ability. However, if Sn is contained excessively, a large amount of the $Mg_2Sn$ phase that is a water-soluble structure is generated, and the discoloration resistance deteriorates. However, from the standpoint of improving the sacrificial corrosion protection ability, it is preferable that a certain amount of Sn be contained. Therefore, the upper limit of the Sn concentration is made to be 0.20% or less (preferably less than 0.10%). Note that the upper limit of the Sn concentration may be 0.09% or less, 0.08% or less, 0.07% or less, 0.06% or less, or 0.05% or less. On the other hand, from the standpoint of improving the discoloration resistance, it is preferable that Sn not be contained. Accordingly, the lower limit of the Sn concentration is made to be 0%. However, from the standpoint of improving the sacrificial corrosion protection ability, the lower limit of the Sn concentration may be greater than 0%, or be 0.01% or more, 0.02%, or 0.03% or more.

<Bi: 0% to Less than 5.0%>

Bi is an element that contributes to the sacrificial corrosion protection ability. Accordingly, the lower limit of the Bi concentration is preferably greater than 0% (preferably 0.1% or more, and more preferably 3.0% or more).

On the other hand, when the Bi concentration increases, the planar surface corrosion resistance tends to deteriorate. Accordingly, the upper limit of the Bi concentration is made to be less than 5.0% (preferably 4.8% or less).

<In: 0% to Less than 2.0%>

In is an element that contributes to the sacrificial corrosion protection ability. Accordingly, the lower limit of the In concentration is preferably greater than 0% (preferably 0.1% or more, and more preferably 1.0% or more).

On the other hand, when the In concentration increases, the planar surface corrosion resistance tends to deteriorate. Accordingly, the upper limit of the In concentration is made to be less than 2.0% (preferably 1.8% or less).

<Ca: 0% to 3.0%>

Ca is an element that can adjust the eluted amount of Mg to a level that is optimal for imparting planar surface corrosion resistance and sacrificial corrosion protection ability.

Accordingly, the lower limit of the Ca concentration is preferably greater than 0% (preferably 0.05% or more).

On the other hand, when the Ca concentration increases, the planar surface corrosion resistance and the processability tend to deteriorate. Accordingly, the upper limit of the Ca concentration is made to be 3.0% or less (preferably 1.0% or less).

<Y: 0% to 0.5%>

Y is an element that contributes to the sacrificial corrosion protection ability. Accordingly, the lower limit of the Y concentration is preferably greater than 0% (preferably 0.1% or more).

On the other hand, when the Y concentration increases, the planar surface corrosion resistance tends to deteriorate. Accordingly, the upper limit of the Y concentration is made to be 0.5% or less (preferably 0.3% or less).

<La and Ce: 0% to Less than 0.5%>

La and Ce are elements that contribute to the sacrificial corrosion protection ability.

Accordingly, the lower limit of each of the La concentration and the Ce concentration is preferably greater than 0% (preferably 0.1% or more).

On the other hand, when the La concentration and the Ce concentration increase, the planar surface corrosion resistance tends to deteriorate. Accordingly, the upper limit of each of the La concentration and the Ce concentration is made to be less than 0.5% (preferably 0.4% or less).

<Si: 0% to Less than 2.5%>

Si is an element that suppresses growth of the Al—Fe alloy layer and contributes to an improvement in the corrosion resistance. Accordingly, the Si concentration is preferably greater than 0% (preferably 0.05% or more, and more preferably 0.1% or more). In particular, in a case in which Sn is not contained (i.e., a case in which the Sn concentration is 0%), from the standpoint of ensuring the scarification corrosion protection ability, the Si concentration is preferably 0.1% or more (preferably 0.2% or more).

On the other hand, when the Si concentration increases, the planar surface corrosion resistance, the sacrificial corrosion protection ability, and the processability tend to deteriorate. Accordingly, the upper limit of the Si concentration is made to be less than 2.5%. In particular, from the standpoints of planar surface corrosion resistance and sacrificial corrosion protection ability, the Si concentration is preferably 2.4% or less, and more preferably 1.8% or less, and even more preferably 1.2% or less.

<Cr, Ti, Ni, Co, V, Nb, Cu and Mn: 0% to 0.25%>

Cr, Ti, Ni, Co, V, Nb, Cu and Mn are elements that contribute to the sacrificial corrosion protection ability. Accordingly, the lower limit of each of the Cr, Ti, Ni, Co, V, Nb, Cu and Mn concentrations is preferably greater than 0% (preferably 0.05% or more, more preferably 0.1% or more).

On the other hand, when the Cr, Ti, Ni, Co, V, Nb, Cu and Mn concentrations increase, the planar surface corrosion resistance tends to deteriorate. Accordingly, the upper limit of each of the Cr, Ti, Ni, Co, V, Nb, Cu and Mn concentrations is made to be 0.25% or less. The upper limit of the Cr, Ti, Ni, Co, V, Nb, Cu and Mn concentrations is preferably 0.22% or less.

<Fe: 0% to 5.0%>

In a case in which the coating layer is formed by a hot dip coating method, certain concentrations of Fe are contained in the Zn—Al—Mg alloy layer and the Al—Fe alloy layer. It has been confirmed that there are no adverse effects on the performances even if Fe is contained in the coating layer (in particular, the Zn—Al—Mg alloy layer) up to a concentration of 5.0%. In most cases, most of the Fe is contained in the Al—Fe alloy layer, and therefore, if the thickness if this layer is large, generally, the Fe concentration is high.

<Sr, Sb, Pb and B: 0% to Less than 0.5%>

Sr, Sb, Pb and B are elements that contribute to the sacrificial corrosion protection ability. Accordingly, the lower limit of each of the Sr, Sb, Pb and B concentrations is preferably greater than 0% (preferably 0.05% or more, and more preferably 0.1% or more).

On the other hand, when the Sr, Sb, Pb and B concentrations increase, the planar surface corrosion resistance tends to deteriorate. Accordingly, the upper limit of each of the Sr, Sb, Pb and B concentrations is made to be less than 0.5%.

<Impurities>

Impurities refer to components that are contained in the raw materials, or components that are mixed-in the manufacturing processes, and means components that are not contained intentionally. For example, there are cases in which, due to the mutual atomic diffusion between the base steel and the coating bath, trace amounts of components other than Fe become mixed-in the coating layer as impurities.

The chemical components of the coating layer are measured by the following method.

First, an acid solution, in which the coating layer has been peeled-off and dissolved by acid that contains an inhibitor that inhibits corrosion of the base steel, is obtained. Next, by measuring the obtained acid solution by ICP analysis, the chemical composition of the coating layer (the chemical composition of the Zn—Al—Mg alloy layer in a case in which the coating layer is a single-layer structure of a Zn—Al—Mg alloy layer, and the chemical composition that is the total of the Al—Fe alloy layer and the Zn—Al—Mg alloy layer in a case in which the coating layer is a multilayer structure of an Al—Fe alloy layer and a Zn—Al—Mg alloy layer) can be obtained. The type of acid is not particularly limited provided that it is an acid that can dissolve the coating layer. Note that the chemical composition is measured as the average chemical composition. Note that, in the ICP analysis, the Zn concentration is determined as "formula: Zn concentration=100%−concentration (%) of other elements".

Here, in a case in which a pre-coated steel material is used as the base steel, the components of the pre-coating are also detected.

For example, in a case in which an Ni pre-coated steel material is used, not only the Ni in the coating layer, but also the Ni in the Ni pre-coating is detected by ICP analysis. Specifically, for example, when a pre-coated steel material of an Ni deposited amount of 1 g/m$^2$ to 3 g/m$^2$ is used as the base steel, even if the Ni concentration that is included in the coating layer is 0%, the Ni concentration is detected as 0.1 to 15%. On the other hand, in a case in which an Ni pre-coated steel material is used as the base steel, at the time when the base steel is immersed in the coating bath, trace amounts of the Ni within the Ni pre-coating layer dissolve in the coating bath. Therefore, the Ni concentration in the coating bath is 0.02 to 0.03% higher, as compared with the Ni concentration within the prepared coating bath. Accordingly, in a case in which an Ni pre-coated steel material is used, the Ni concentration in the coating layer is higher at a maximum of 0.03%.

Thus, in the present disclosure, in a case in which an Ni pre-coated steel material is used, when an Ni concentration that is greater than 0.28 (0.25% (the upper limit of the Ni concentration in the coating layer)+0.03%)% and is 15% or less is detected by ICP analysis, the Ni concentration in the coating layer is considered to be 0%. The Zn concentration at this time is determined by "formula: Zn concentration=100%−concentration (%) of other elements other than Ni".

On the other hand, in a case in which an Ni pre-coated steel material is used, when an Ni concentration that is greater than 15% is detected by ICP analysis, it is considered that Ni is contained in the coating layer in excess of 0.25% (the upper limit of the Ni concentration in the coating layer). Note that, in the present disclosure, the components in the coating layer are measured by using only an ICP analysis method, but the Ni concentration in the coating layer can be analyzed by using glow discharge optical emission spectrometry (quantitative GDS) together with the ICP analysis method.

The metal structure of the Zn—Al—Mg alloy layer is described next.

In the metal structure of the Zn—Al—Mg alloy layer, Al crystals are present, and the average value of the cumulative circumferential length of the Al crystals is 88 to 195 mm/mm$^2$.

If the average value of the cumulative circumferential length of the Al crystals is less than 88 mm/mm$^2$, the Al crystals become too coarse and the processability deteriorates. On the other hand, if the average value of the cumulative circumferential length of the Al crystals is greater than 195 mm/mm$^2$, the Al crystals are extremely fine, and the contact surface area between the Al crystals and the phases at the peripheries of the Al crystals increases. As a result, the greater the contact surface area between the Al crystals and the phases at the peripheries of the Al crystals, the easier it is for corrosion of the peripheries of the Al crystals to occur, and therefore, the planar surface corrosion resistance deteriorates, and the dispersion in the planar surface corrosion resistance also becomes large.

Accordingly, the average value of the cumulative circumferential length of the Al crystals is made to be 88 to 195 mm/mm$^2$. The lower limit of the average value of the cumulative circumferential length of the Al crystals is preferably is 95 mm/mm$^2$ or more, and more preferably 105 mm/mm$^2$ or more. The upper limit of the average value of the cumulative circumferential length of the Al crystals is preferably 185 mm/mm$^2$ or less, and more preferably 170 mm/mm$^2$ or less.

The metal structure of the Zn—Al—Mg alloy layer has Al crystals. The metal structure of the Zn—Al—Mg alloy layer may have a Zn—Al phase, in addition to the Al crystals.

The Al crystals correspond to an "α phase in which Zn is dissolved at a concentration of 0 to 3%". On the other hand, the Zn—Al phase corresponds to a "β phase in which a Zn phase (η phase) is included at more than 70% to 85%, and the α phase and the Zn phase (η phase) are finely separated".

Figure 2:
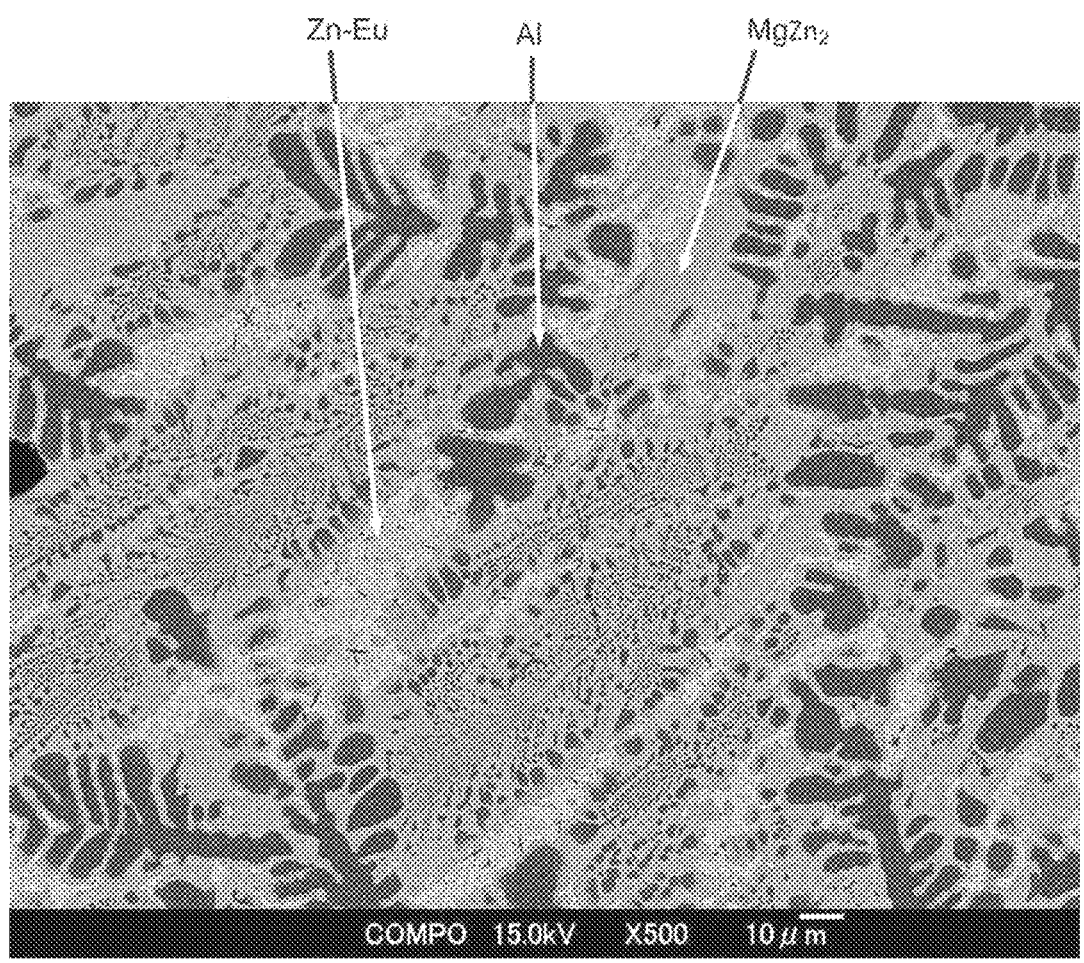
FIG. 2 is an SEM backscattered electron image (at a magnification of 500×) showing an example of the Zn—Al—Mg alloy layer of the coated steel material of the present disclosure.
Figure 3:
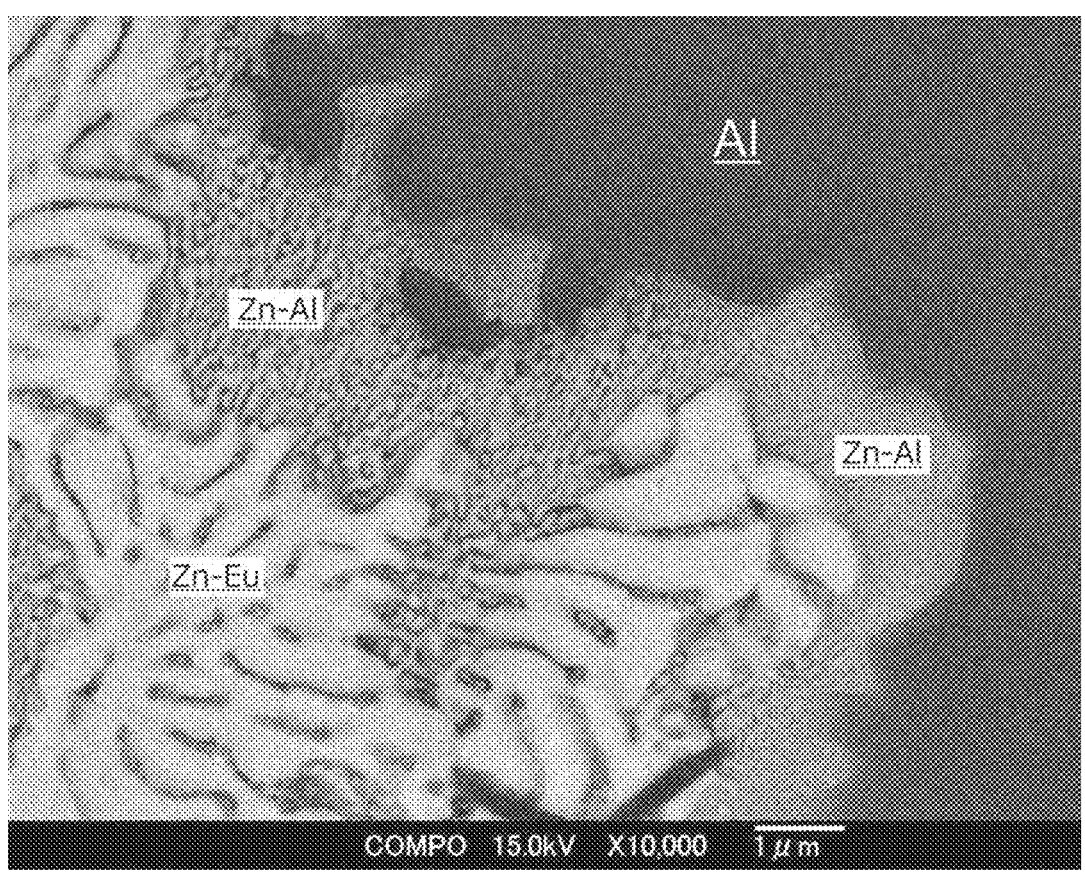
FIG. 3 is an SEM backscattered electron image (at a magnification of 10,000×) showing an example of the Zn—Al—Mg alloy layer of the coated steel material of the present disclosure.

Here, an example of an SEM backscattered electron image of the Zn—Al—Mg alloy layer at a polished surface that was obtained by polishing the surface of the Zn—Al—Mg alloy layer to ½ of the layer thickness, is shown in FIG. 1 to FIG. 3. FIG. 1 is an SEM backscattered electron image at a magnification of 100×, FIG. 2 at a magnification of 500×, and FIG. 3 at a magnification of 10000×.

Note that, in FIG. 1 to FIG. 3, Al indicates the Al crystals, Zn—Al indicates the Zn—Al phase, MgZn$_2$ indicates the MgZn$_2$ phase, and Zn—Eu indicates a Zn-based eutectic phase.

In the backscattered electron images of the Zn—Al—Mg alloy layer, although the area fractions of the respective structures are not particularly limited, from the standpoint of improving the stable planar surface corrosion resistance, the area fraction of the Al crystals is preferably 8 to 45%, and more preferably 15 to 35%. Namely, it is preferably that the Al crystals are present in the above ranges of area fractions.

Examples of the remaining structures other than the Al crystals and the Zn—Al phase are the MgZn$_2$ phase, the Zn-based eutectic phase (specifically, Zn—Al—MgZn$_2$—Mg$_2$Sn, or the like) and the like.

Here, methods of measuring the average value of the cumulative circumferential length of the Al crystals, and the area fraction of the Al crystals, are described.

The average value of the cumulative circumferential length of the Al crystals, and the area fraction of the Al crystals, are measured by using a backscattered electron image of the Zn—Al—Mg alloy layer obtained by observing the surface of the Zn—Al—Mg alloy layer after polishing to ½ of the layer thickness, by a scanning electron microscope at a magnification of 100×. Specifically, the methods are as follows.

First, a sample is taken from the coated steel material that is the object of measurement. However, the sample is taken from a place that is not in the vicinity (within 2 mm from the end surface) of the punched end face of the coated steel material and is free from defects of the coating layer.

Next, the surface of the coating layer (specifically, the Zn—Al—Mg alloy layer) of the sample is polished in the thickness direction of the coating layer (hereinafter also called the "Z-axis direction").

In the polishing of the surface of the coating layer in the Z-axis direction, the surface of the Zn—Al—Mg alloy layer is polished to ½ of the layer thickness. In this polishing, the surface of the Zn—Al—Mg alloy layer is dry-polished with a #1200 abrasive sheet, and thereafter, finish-polishing is carried out by using, in order, a finishing liquid containing alumina of an average particle diameter of 3 μm, a finishing liquid containing alumina of an average particle diameter of 1 μm, and a finishing liquid containing colloidal silica.

Note that the Zn intensity of the surface of the Zn—Al—Mg alloy layer is measured by XRF (X-ray fluorescence analysis) before and after the polishing. When the Zn intensity after the polishing becomes ½ of the Zn intensity before the polishing, the layer thickness of the Zn—Al—Mg alloy layer is deemed to be ½.

Next, the polished surface of the Zn—Al—Mg alloy layer of the sample is observed by a scanning electron microscope (SEM) at a magnification of 100×, and a backscattered electron image (hereinafter also called "SEM backscattered electron image") of the Zn—Al—Mg alloy layer is obtained. The SEM observation conditions are acceleration voltage: 15 kV, probe current: 10 nA, and visual field size: 1222.2 μm×927.8 μm.

In order to identify the respective phases present in the Zn—Al—Mg alloy layer, an FE-SEM or a TEM (transmission electron microscope) equipped with an EDS (energy dispersive X-ray analyzer) is used. In a case in which a TEM is used, the polished surface of the Zn—Al—Mg alloy layer of the sample of that same object of measurement is subjected to FIB (focused ion beam) processing. After the FIB processing, a TEM electron diffraction image of the polished surface of the Zn—Al—Mg alloy layer is obtained. Then, the metals contained in the Zn—Al—Mg alloy layer are identified.

Next, the SEM backscattered electron image is compared with the results of identification of the FE-SEM or TEM electron diffraction image, and each phase present in the Zn—Al—Mg alloy layer in the SEM backscattered electron image is identified. Note that, in the identification of each phase present in the Zn—Al—Mg alloy layer, it is preferable that EDS point analysis is performed, and the results of the EDS point analysis and the results of identification of the TEM electron diffraction image are compared. Note that an EPMA apparatus may be used to identify the respective phases.

Next, in the SEM backscattered electron image, three values that are the lightness of the grayscale, the hue and the contrast that are expressed by each phase in the Zn—Al—Mg alloy layer are determined. Since the three values that are lightness, hue and contrast that are exhibited by each phase reflect the atomic number of the element included in each phase, usually, there is the tendency that phases that contain higher contents of Al or Mg that have small atomic numbers exhibit a black color, and phases that contain higher contents of Zn exhibit a white color.

Figure 4:
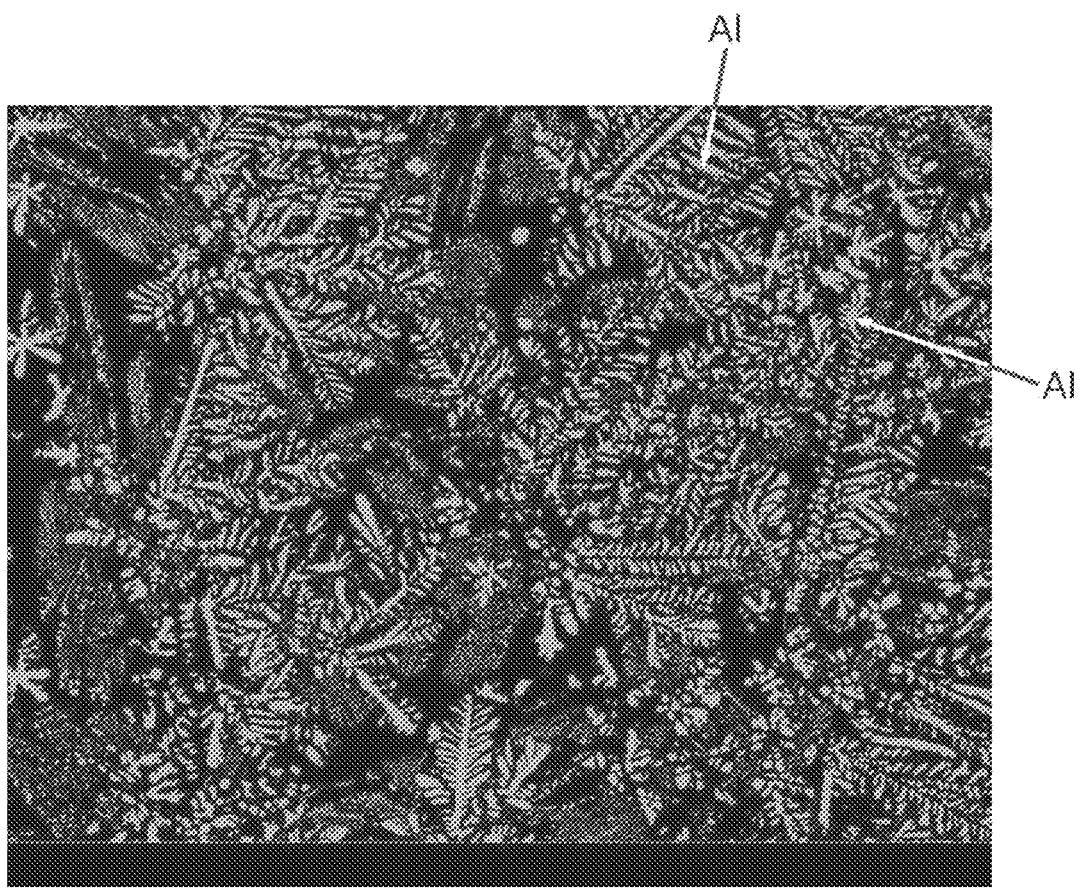
FIG. 4 is a drawing showing an example of an image obtained by subjecting a backscattered electron image (SEM backscattered electron image) of the Zn—Al—Mg alloy layer of the coated steel material of the present disclosure to image processing (binarization) such that the Al crystals can be identified.

From the above-described results of comparison of the EDS, image processing (binarization), which is such that only the ranges of the aforementioned three values expressed by the Al crystals contained in the Zn—Al—Mg alloy layer change color so as to match the SEM backscattered electron image, is carried out (e.g., only a specific phase is displayed as a white image, and the surface areas (numbers of pixels) or the like of the respective phases in the visual field are calculated, see FIG. 4). By carrying out this image processing, the area fraction that the Al crystals in the Zn—Al—Mg alloy layer occupy in the SEM backscattered electron image is determined.

Note that FIG. 4 is an example of an image obtained by subjecting the backscattered electron image (the SEM backscattered electron image) of the Zn—Al—Mg alloy layer to image processing (binarization) such that the Al crystals can be identified. In FIG. 4, Al indicates the Al crystals.

Further, the area fraction of the Al crystals in the Zn—Al—Mg alloy layer is the average value of the area fractions of the Al crystals that are determined by the above-described procedures in three visual fields.

Note that, in a case in which it is difficult to discriminate the Al crystals, electron beam diffraction by TEM, or EDS point analysis, is performed.

As an example, there is described a method of identifying the Al crystals in an SEM backscattered electron image (a greyscale image stored in 8 bits, displayed in 256 colors) by using the binarization processing function, which is based on two threshold values, of WinROOF2015 (image analysis software) produced by Mitani Corporation. Note that, in a greyscale image that is stored in 8 bits, when the light intensity is 0, black is expressed, and, when the light intensity is the maximum value of 255, white is expressed. In the case of the above-described SEM backscattered electron image, it is clear from the results of identification by the FE-SEM or the TEM that the Al crystals can be identified with high accuracy if the threshold values of the light intensity are set to 10 and 95. Thus, the image is processed such that color changes in the light intensity range of 10 to 95, and the Al crystals are identified. Note that image analysis software other than WinROOF 2015 may be used for the binarization processing.

Next, by using the automatic shape characteristic measurement function of WinROOF2015 (image analysis software) produced by Mitani Corporation, the circumferential lengths of the Al crystals identified by the above-described image processing are totaled, and the cumulative circumferential length of the Al crystals is determined. Then, the cumulative circumferential length of the Al crystals per unit surface area ($mm^2$) is calculated by dividing the cumulative circumferential length of the Al crystals by the surface area of the visual field.

This procedure is carried out in three visual fields, and the arithmetic average of the cumulative circumferential lengths of the Al crystals per unit area ($mm^2$) is defined as the "average value of the cumulative circumferential length of the Al crystals".

Further, the area fraction of the Al crystals also can be determined by using the automatic shape characteristic measurement function of WinROOF2015 (image analysis software) produced by Mitani Corporation. Specifically, in the above-described backscattered electron image of the Zn—Al—Mg alloy layer, the area fraction of the Al crystals identified by the binarization (the area fraction with respect to the visual field surface area) is calculated by using this function. This procedure is carried out in three visual fields, and the calculated average is defined as the area fraction of the Al crystals.

The thickness of the Al—Fe alloy layer is measured as follows.

The thickness is measured at five arbitrary positions of the identified Al—Fe alloy layer in an SEM backscattered electron image (wherein the magnification is 5000× and visual field size: length 50 μm×width 200 μm, provided that there is a visual field in which the Al—Fe alloy layer is visible) of a cross-section (a section cut along the thickness direction of the coating layer) of the coating layer that is obtained by embedding a sample in resin and carrying out polishing. The arithmetic average of the five positions is defined as the thickness of the Al—Fe alloy layer.

An example of the method of manufacturing the coated steel material of the present disclosure is described next.

The coated steel material of the present disclosure is obtained by forming a coating layer having the above-described predetermined chemical composition and metal structure on the surface(s) (i.e., on one side or both sides) of a base steel (a base steel sheet or the like) by a hot dip coating method.

Specifically, the hot dip coating is performed under the following conditions as an example.

First, the temperature of the coating bath is set to be greater than or equal to the melting point of the coating bath +20° C., and, after the base steel is pulled-up from the coating bath, the base steel is cooled in a temperature range that is from the coating bath temperature to the coating solidification start temperature, and at an average cooling rate that is greater than the average cooling rate in the temperature range that is from the coating solidification start temperature to the coating solidification start temperature −30° C.

Next, cooling is carried out in a temperature range that is from the coating solidification start temperature to the coating solidification start temperature −30° C., at an average cooling rate of 12° C./s or less.

Next, cooling is carried out in a temperature range that is from the coating solidification start temperature −30° C. to the coating solidification start temperature −300° C., at an average cooling rate that is higher than the average cooling rate in the temperature range that is from the coating solidification start temperature to the coating solidification start temperature −30° C.

Namely, an example of the method of manufacturing the coated steel material of the present disclosure is a method in which a hot dip coating treatment is carried out on a base steel under the conditions that the temperature of the coating bath is made to be greater than or equal to the melting point of the coating bath +20° C., and, after the base steel is pulled-up from the coating bath, the base steel is cooled in three stages in which A>B, B≤12° C./s, and C>B, wherein A is the average cooling rate in the temperature range that is from the coating bath temperature to the coating solidification start temperature, B is the average cooling rate in the temperature range that is from the coating solidification start temperature to the coating solidification start temperature −30° C., and C is the average cooling rate from the coating solidification start temperature −30° C. to the coating solidification start temperature −300° C.

Al crystals are formed by setting the coating bath temperature to be greater than or equal to the melting point of coating bath +20° C., and pulling the base steel up from the coating bath.

Then, by carrying out cooling at an average cooling rate of less than or equal to 12° C./s in the temperature range that is from the coating solidification start temperature to the coating solidification start temperature −30° C., in the Zn—Al—Mg alloy layer, a metal structure is formed in which Al crystals are present, and the average value of the cumulative circumferential length of the Al crystals falls within the above-described range. The cooling at this average cooling rate is carried out by, for example, cooling by air in which atmospheric air is blown-out as a weak wind.

However, from the standpoint of preventing the coating from winding onto a top roll and the like, the lower limit of the average cooling rate in the temperature range that is from the coating solidification start temperature to the coating solidification start temperature −30° C. is made to be 0.5° C./s or more.

Note that the coating solidification start temperature can be measured by the following method. The coating solidification start temperature is the temperature at which a differential thermal peak first appears at the time when a sample is cooled at 10° C./min after having been collected from the coating bath and heated by a DSC to greater than or equal to the melting point of the coating bath +20° C.

In the method of manufacturing a coated steel material of the present disclosure, the average cooling rate in the temperature range that is from the temperature at the time when the base steel is pulled-up from the coating bath (i.e., the temperature of the coating bath) to the coating solidification start temperature, is not particularly limited. However, it is good to make this average cooling rate be 0.5° C./s to 20° C./s from the standpoints of preventing the coating from winding onto a top roll and the like, and suppressing defects in the external appearance such as ripple marks and the like.

However, the average cooling rate in the temperature range that is from the coating bath temperature to the coating solidification start temperature is made to be an average cooling rate that is greater than the cooling rate in the temperature range that is from the coating solidification start temperature to the coating solidification start temperature −30° C. Due thereto, the nucleation sites of the Al crystals can be increased, and excessive coarsening of the Al crystals can be suppressed.

Further, the average cooling rate in the temperature range that is from the coating solidification start temperature −30° C. to the coating solidification start temperature −300° C. also is not particularly limited, but it is good to make this average cooling rate be 0.5° C./s to 20° C./s from the standpoints of preventing the coating from winding onto a top roll, and the like.

However, the average cooling rate in the temperature range that is from the coating solidification start temperature −30° C. to the coating solidification start temperature −300° C. is made to be an average cooling rate that is greater than the average cooling rate in the temperature range that is from the coating solidification start temperature to the coating solidification start temperature −30° C. Due thereto, excessive coarsening of the Al crystals can be suppressed, and the processability can be ensured.

Note that the Al—Fe alloy layer that is formed between the base steel and the Zn—Al—Mg alloy layer is formed and grown rapidly in a time period that is even less than 1 sec, immediately after immersion in the coating bath. This growth rate is higher when the temperature of the coating bath is higher, and becomes even higher when the immersion time in the coating bath is longer. However, if the temperature of the coating bath is less than 500° C., growth substantially ceases. Therefore, it is good to reduce the immersion time, or to immediately transition from the solidification to the cooling step.

Further, when, after being solidified once, the coated steel material is reheated and the coating layer is re-melted, the structural phases totally disappear and become liquid phase states. Accordingly, for example, even at a coated steel material that has undergone quenching or the like once, the structure control that is prescribed in the present disclosure can be implemented in the process of reheating offline and carrying out an appropriate heat treatment. In this case, it is preferable to set the reheating temperature of the coating layer to be just above the melting point of the coating bath, and to set a temperature range that is such that the Al—Fe alloy layer does not grow excessively.

Post-treatments that can be applied to the coated steel material of the present disclosure are described hereinafter.

A film may be formed on the coating layer at the coated steel material of the present disclosure. One layer or two or more layers can be formed at the film. Examples of the type of the film that is directly on the coating layer include a chromate film, a phosphate film, and a chromate-free film. A chromate treatment, phosphate treatment, and chromate-free treatment for forming these films can be carried out by known methods.

As chromate treatments, there are an electrolytic chromate treatment in which a chromate film is formed by electrolysis, a reactive chromate treatment in which a film is formed by utilizing a reaction with a material, and thereafter, the excess treatment liquid is washed off, and a coating type chromate treatment in which a treatment liquid is coated on an object to be coated and is dried without washing by water, and the film is formed. Any of these treatments may be employed.

Examples of the electrolytic chromate treatment are electrolytic chromate treatments that use chromic acid, silica sol, a resin (an acrylic resin, a vinyl ester resin, a vinyl acetate/acrylic emulsion, carboxylated styrene butadiene latex, a diisopropanolamine-modified epoxy resin, or the like), and hard silica.

Examples of the phosphate treatment include a zinc phosphate treatment, a zinc calcium phosphate treatment, and a manganese phosphate treatment.

Chromate-free treatments are particularly preferable because they do not impose a burden on the environment. Chromate-free treatments include an electrolytic chromate-free treatment in which a chromate-free film is formed by electrolysis, a reactive chromate-free treatment in which a film is formed by utilizing a reaction with a material, and thereafter, the excess treatment liquid is washed off, and a coating type chromate-free treatment in which a treatment liquid is coated on an object to be coated and is dried without washing by water, and the film is formed. Any of these treatments may be employed.

Moreover, one layer or two or more layers of an organic resin film may be provided on the film that is directly on the coating layer. The type of the organic resin is not particularly limited, and examples thereof include polyester resins, polyurethane resins, epoxy resins, acrylic resins and polyolefin resins, as well as modified products of these resins, and the like. Here, a modified product means a resin in which a reactive functional group that is included in the structure of the resin is made to react with another compound (such as a monomer or a crosslinking agent) that has, in the structure thereof, a functional group that can react with the aforementioned functional group.

As such an organic resin, one type or a mixture of two or more types of (unmodified) organic resins may be used, or one type or a mixture of two or more types of organic resins, which are obtained by modifying at least one type of organic resin in the presence of at least one other type of organic resin, may be used. Further, the organic resin film may contain an arbitrary coloring pigment or rust preventing pigment. A water-based form prepared by dissolving or dispersion in water can also be used.

EXAMPLES

Examples of the present disclosure will be described. However, the conditions in the Examples are one example of conditions that are employed in order to confirm the feasibility and effects of the present disclosure, and the present disclosure is not limited to this one example of conditions. The present disclosure can employ various conditions provided that the object of the present disclosure can be achieved without departing from the gist of the present disclosure.

(Examples)

In order to obtain coating layers having the chemical compositions shown in Table 1 to Table 2, a predetermined amount of a pure metal ingot was used, and, after the ingot was melted in a vacuum melting furnace, a coating bath was prepared in air. A batch-wise hot dip coating apparatus was used to manufacture a coated steel sheet.

As the base steel, a general, hot-rolled carbon steel sheet (C concentration <0.1%) having a coate thickness of 2.3 mm was used, and degreasing and pickling were carried out immediately before the coating process.

Further, in some of the Examples, an Ni pre-coated steel material, which was obtained by carrying out Ni pre-coating on a general hot-rolled carbon steel sheet of a coate thickness of 2.3 mm, was used as the base steel. The deposited amount of the Ni was made to be 1 g/m$^2$ to 3 g/m$^2$. Note that Examples using an Ni pre-coated steel material as the base steel are marked "pre-Ni" in the "base steel" column in the tables, and the concentration of Ni in the coating bath is listed in parentheses in the Ni concentration column.

In all instances of fabricating a sample, up until the time of immersion in the coating bath, equivalent reduction treatment methods were carried out on the base steels. Namely, the temperature of the base steel was raised from room temperature to 800° C. by electric heating in an $N_2$—$H_2$ (5%) environment (with a dew point of −40° C. or less and an oxygen concentration of less than 25 ppm), and, after this state was maintained for 60 seconds, $N_2$ gas was blown onto the base steel, and the base steel was cooled to the coating bath temperature +10° C., and was immediately immersed in the coating bath.

Note that the immersion times in the coating baths of all of the coated steel sheets as well are listed as times in the tables. The $N_2$ gas wiping pressure was adjusted, and coated steel sheets were fabricated such that the coating thicknesses were 30 μm (±1 μm).

The standard temperature of the coating bath was set to the melting point +20° C., and the temperature was raised in some cases, and coating was carried out. The immersion time in the coating bath was made to be 2 seconds. After the base steel was pulled-up from the coating bath, the coating layer was obtained by cooling processes in which the average cooling rates of the following first through third stages that are listed in Table 1 to Table 2 were made to be the conditions listed in Table 1 to Table 2.

average cooling rate in first stage: the average cooling rate in the temperature range that is from the coating bath temperature to the coating solidification start temperature average cooling rate in second stage: the average cooling rate in the temperature range that is from the coating solidification start temperature to the coating solidification start temperature −30° C.

average cooling rate in third stage: the average cooling rate in the temperature range that is from the coating solidification start temperature −30° C. to the coating solidification start temperature −300° C.

—Various Measurements—

Samples were cut-out from the obtained coated steel sheets. Then, the following items were measured in accordance with the previously-described methods.

average value of cumulative circumferential length of Al crystals (listed as "circumferential length of Al crystals" in the tables)

area fraction of Al crystals thickness of Al—Fe alloy layer (however, in examples in which an Ni pre-coated steel sheet was used as the base steel, this expresses the thickness of the Al—Ni—Fe alloy layer)

—Planar Surface Corrosion Resistance—

In order to compare the planar surface corrosion resistances, the manufactured samples were subjected to an accelerated corrosion test (JASO M609-91) for 120 cycles, and immersed in a 30% chromic acid aqueous solution that was at room temperature so as to remove white rust, and the planar surface corrosion resistance was evaluated from the corrosion weight loss.

The test was carried out five times. Cases in which in which the average corrosion weight loss was 80 g/m² or less, and the maximum value and the minimum value of the corrosion weight loss in n=5 were within ±100% of the average value, were rated as "A+". Cases in which the average corrosion weight loss was 100 g/m² or less, and the maximum value and the minimum value of the corrosion weight loss in n=5 were within ±100% of the average value, were rated as "A". Other cases were rated as "NG".

—Sacrificial Corrosion Protection Ability (Cut End Face Corrosion Resistance)—

In order to compare the sacrificial corrosion protection abilities (cut end face corrosion resistances), the samples were sheared to 50 mm×100 mm, the top and bottom end surfaces were sealed, the samples were subjected to an accelerated corrosion test (JASO M609-91) for 120 cycles, and the average value of the red rust formation surface area ratios of the exposed portions of the end surfaces of the lateral surface portions was evaluated. Cases in which the red rust formation surface area ratio was 50% or less were rated "A+", cases in which this ratio was 70% or less were rated "A", and cases in which this ratio was greater than 70% were rated "NG".

—Processability—

In order to evaluate the processability of the coating layer, the coated steel sheet was subjected to 90° V-bending, a cellophane tape of a width of 24 mm was pressed onto the trough of the V-bend and peeled-off, and the powdering was evaluated visually. Cases in which the peeled-off powder of the powdering did not adhere to the tape were rated "A", cases in which there was a slight amount that adhered were rated "A−", and cases in which there was adhesion were rated as "NG".

—Discoloration Resistance—

In order to evaluate the discoloration resistance, the samples were sheared to 50 mm×100 mm, and a structure in which the entire sample was layered with the orientations of the burrs at the end surfaces being lined-up, was wrapped in waterproofing paper. Steel coates were laid on the top and the bottom of the wrapped samples, and the four corners of the steel coates were fixed by nuts and bolts. At the time of fastening the nuts, load of 12N·m was applied by a torque wrench. Thereafter, the sample was inserted into a constant-temperature constant-humidity vessel (KCL-2000 manufactured by EYELA) at 50° C. and an RH of 80%, and the color difference after seven days was evaluated. For the color difference, the L value, a* value and b* value of the sample were measured before and after testing by a colorimeter (CR-400 manufactured by Konica Minolta Optics), and the color difference ΔE was investigated.

Cases in which ΔE was 3 or less were rated "A+", cases in which ΔE was greater than 3 to 5 or less were rated "A", and cases in which ΔE was greater than 5 were rated "NG".

—Overall Evaluation—

Examples in which the respective evaluation results of the planar surface corrosion resistance, sacrificial corrosion protection ability, processability evaluation, and discoloration resistance evaluation were all "A", "A+" or "A−" were rated "A", and examples in which even one of these was "NG" were rated "NG".

The Examples are listed in Table 1 to Table 2.

TABLE 1

| No. | category | base steel | plating bath melting point (° C.) | plating bath temperature (° C.) | immersion time period (sec) | plating solidification start temperature (° C.) | first stage average cooling rate (° C./s) | second stage average cooling rate (° C./s) | third stage average cooling rate (° C./s) |
|---|---|---|---|---|---|---|---|---|---|
| 1 | Example | — | 380 | 400 | 2 | 360 | 15 | 6 | 15 |
| 2 | Example | — | 470 | 490 | 2 | 450 | 15 | 6 | 15 |
| 3 | Example | — | 460 | 480 | 2 | 440 | 15 | 6 | 15 |
| 4 | Example | — | 465 | 485 | 2 | 445 | 15 | 6 | 15 |
| 5 | Example | — | 460 | 480 | 2 | 440 | 15 | 6 | 15 |
| 6 | Example | — | 460 | 480 | 2 | 440 | 15 | 6 | 15 |
| 7 | Example | — | 460 | 480 | 2 | 440 | 15 | 6 | 15 |
| 8 | Example | — | 460 | 480 | 2 | 440 | 15 | 6 | 15 |
| 9 | Example | — | 460 | 480 | 2 | 440 | 15 | 6 | 15 |
| 10 | Example | — | 460 | 480 | 2 | 440 | 15 | 6 | 15 |
| 11 | Example | — | 470 | 490 | 2 | 450 | 15 | 6 | 15 |
| 12 | Example | — | 460 | 480 | 2 | 440 | 15 | 6 | 15 |
| 13 | Example | — | 460 | 480 | 2 | 440 | 15 | 6 | 15 |
| 14 | Example | — | 450 | 470 | 2 | 430 | 15 | 6 | 15 |
| 15 | Example | — | 440 | 460 | 2 | 420 | 15 | 6 | 15 |
| 16 | Example | — | 390 | 410 | 2 | 370 | 15 | 6 | 15 |
| 17 | Example | — | 365 | 385 | 2 | 345 | 15 | 6 | 15 |
| 18 | Example | — | 460 | 480 | 2 | 440 | 15 | 6 | 15 |
| 19 | Example | — | 460 | 480 | 2 | 440 | 15 | 6 | 15 |
| 20 | Example | — | 460 | 480 | 2 | 440 | 15 | 6 | 15 |
| 21 | Example | — | 460 | 480 | 2 | 440 | 15 | 6 | 15 |
| 22 | Example | — | 460 | 480 | 2 | 440 | 15 | 6 | 15 |
| 23 | Example | — | 460 | 480 | 2 | 440 | 15 | 6 | 15 |
| 24 | Example | — | 460 | 480 | 2 | 440 | 15 | 6 | 15 |
| 25 | Example | — | 460 | 480 | 2 | 440 | 15 | 6 | 15 |
| 26 | Example | — | 460 | 480 | 2 | 440 | 15 | 6 | 15 |
| 27 | Example | — | 470 | 490 | 2 | 450 | 15 | 6 | 15 |
| 28 | Example | — | 460 | 480 | 2 | 440 | 15 | 6 | 15 |
| 29 | Example | — | 460 | 480 | 2 | 440 | 15 | 6 | 15 |
| 30 | Example | — | 460 | 480 | 2 | 440 | 15 | 6 | 15 |
| 31 | Example | — | 460 | 480 | 2 | 440 | 15 | 6 | 15 |

TABLE 1-continued

| | | | | | | | | | | |
|---|---|---|---|---|---|---|---|---|---|---|
| 32 | Example | — | 460 | 480 | 2 | 440 | 15 | 6 | 15 |
| 33 | Example | — | 460 | 480 | 2 | 440 | 15 | 6 | 15 |
| 34 | Example | — | 460 | 480 | 2 | 440 | 15 | 6 | 15 |
| 35 | Example | — | 460 | 480 | 2 | 440 | 15 | 6 | 15 |
| 36 | Example | — | 460 | 550 | 2 | 440 | 15 | 6 | 15 |
| 37 | Example | — | 460 | 480 | 2 | 440 | 15 | 6 | 15 |
| 38 | Example | — | 460 | 480 | 2 | 440 | 15 | 6 | 15 |
| 39 | Example | — | 460 | 480 | 2 | 440 | 15 | 6 | 15 |
| 40 | Example | — | 460 | 480 | 2 | 440 | 15 | 6 | 15 |
| 41 | Example | preNi | 460 | 480 | 2 | 440 | 15 | 6 | 15 |
| 42 | Example | preNi | 460 | 480 | 2 | 440 | 15 | 6 | 15 |
| 43 | Example | preNi | 460 | 480 | 2 | 440 | 15 | 6 | 15 |
| 44 | Example | preNi | 460 | 480 | 2 | 440 | 15 | 6 | 15 |

| | | plating layer composition (% by mass) | | | | | | | | | | | |
|---|---|---|---|---|---|---|---|---|---|---|---|---|---|
| No. | category | Zn | Al | Mg | Sn | Bi | In | Ca | Y | La | Ce | Si | Cr | Ti |
| 1 | Example | 88.32 | 5.5 | 6 | 0.08 | 0 | 0 | 0 | 0 | 0 | 0 | 0 | 0 | 0 |
| 2 | Example | 69.32 | 24.5 | 6 | 0.08 | 0 | 0 | 0 | 0 | 0 | 0 | 0 | 0 | 0 |
| 3 | Example | 78.32 | 18 | 3.5 | 0.08 | 0 | 0 | 0 | 0 | 0 | 0 | 0 | 0 | 0 |
| 4 | Example | 69.82 | 18 | 12 | 0.08 | 0 | 0 | 0 | 0 | 0 | 0 | 0 | 0 | 0 |
| 5 | Example | 75.8 | 18 | 6 | 0.10 | 0 | 0 | 0 | 0 | 0 | 0 | 0 | 0 | 0 |
| 6 | Example | 75.5 | 18 | 6 | 0.10 | 0 | 0 | 0.2 | 0 | 0 | 0 | 0.1 | 0 | 0 |
| 7 | Example | 75.7 | 18 | 6 | 0.20 | 0 | 0 | 0 | 0 | 0 | 0 | 0 | 0 | 0 |
| 8 | Example | 75.5 | 18 | 6 | 0.20 | 0 | 0 | 0.1 | 0 | 0 | 0 | 0.1 | 0 | 0 |
| 9 | Example | 75.5 | 18 | 6 | 0.20 | 0 | 0 | 0 | 0 | 0 | 0 | 0.2 | 0 | 0 |
| 10 | Example | 75.4 | 18 | 6 | 0.00 | 0 | 0 | 0 | 0 | 0 | 0 | 0.5 | 0 | 0 |
| 11 | Example | 74.87 | 18 | 6 | 0.03 | 0 | 0 | 0 | 0 | 0 | 0 | 1 | 0 | 0 |
| 12 | Example | 74.04 | 18 | 6 | 0.06 | 0 | 0 | 0.3 | 0 | 0 | 0 | 1.5 | 0 | 0 |
| 13 | Example | 75.81 | 18 | 6 | 0.09 | 0 | 0 | 0 | 0 | 0 | 0 | 0 | 0 | 0 |
| 14 | Example | 75.79 | 18 | 6 | 0.13 | 0 | 0 | 0 | 0 | 0 | 0 | 0 | 0 | 0 |
| 15 | Example | 75.75 | 18 | 6 | 0.15 | 0 | 0 | 0 | 0 | 0 | 0 | 0 | 0 | 0 |
| 16 | Example | 75.73 | 18 | 6 | 0.17 | 0 | 0 | 0 | 0 | 0 | 0 | 0 | 0 | 0 |
| 17 | Example | 85.74 | 10 | 4 | 0.19 | 0 | 0 | 0 | 0 | 0 | 0 | 0 | 0 | 0 |
| 18 | Example | 71.32 | 18 | 6 | 0.08 | 4.5 | 0 | 0 | 0 | 0 | 0 | 0 | 0 | 0 |
| 19 | Example | 74.32 | 18 | 6 | 0.08 | 0 | 1.5 | 0 | 0 | 0 | 0 | 0 | 0 | 0 |
| 20 | Example | 75.72 | 18 | 6 | 0.08 | 0 | 0 | 0.1 | 0 | 0 | 0 | 0 | 0 | 0 |
| 21 | Example | 75.32 | 18 | 6 | 0.08 | 0 | 0 | 0.5 | 0 | 0 | 0 | 0 | 0 | 0 |
| 22 | Example | 74.82 | 18 | 6 | 0.08 | 0 | 0 | 1 | 0 | 0 | 0 | 0 | 0 | 0 |
| 23 | Example | 72.82 | 18 | 6 | 0.08 | 0 | 0 | 3 | 0 | 0 | 0 | 0 | 0 | 0 |
| 24 | Example | 75.32 | 18 | 6 | 0.08 | 0 | 0 | 0 | 0.5 | 0 | 0 | 0 | 0 | 0 |
| 25 | Example | 75.42 | 18 | 6 | 0.08 | 0 | 0 | 0 | 0 | 0.4 | 0 | 0 | 0 | 0 |
| 26 | Example | 75.42 | 18 | 6 | 0.08 | 0 | 0 | 0 | 0 | 0 | 0.4 | 0 | 0 | 0 |
| 27 | Example | 73.52 | 18 | 6 | 0.08 | 0 | 0 | 0 | 0 | 0 | 0 | 2.3 | 0 | 0 |
| 28 | Example | 75.62 | 18 | 6 | 0.08 | 0 | 0 | 0 | 0 | 0 | 0 | 0 | 0.2 | 0 |
| 29 | Example | 75.62 | 18 | 6 | 0.08 | 0 | 0 | 0 | 0 | 0 | 0 | 0 | 0 | 0.2 |
| 30 | Example | 75.62 | 18 | 6 | 0.08 | 0 | 0 | 0 | 0 | 0 | 0 | 0 | 0 | 0 |
| 31 | Example | 75.62 | 18 | 6 | 0.08 | 0 | 0 | 0 | 0 | 0 | 0 | 0 | 0 | 0 |
| 32 | Example | 75.62 | 18 | 6 | 0.08 | 0 | 0 | 0 | 0 | 0 | 0 | 0 | 0 | 0 |
| 33 | Example | 75.62 | 18 | 6 | 0.08 | 0 | 0 | 0 | 0 | 0 | 0 | 0 | 0 | 0 |
| 34 | Example | 75.62 | 18 | 6 | 0.08 | 0 | 0 | 0 | 0 | 0 | 0 | 0 | 0 | 0 |
| 35 | Example | 75.62 | 18 | 6 | 0.08 | 0 | 0 | 0 | 0 | 0 | 0 | 0 | 0 | 0 |
| 36 | Example | 70.92 | 18 | 6 | 0.08 | 0 | 0 | 0 | 0 | 0 | 0 | 0 | 0 | 0 |
| 37 | Example | 75.42 | 18 | 6 | 0.08 | 0 | 0 | 0 | 0 | 0 | 0 | 0 | 0 | 0 |
| 38 | Example | 75.42 | 18 | 6 | 0.08 | 0 | 0 | 0 | 0 | 0 | 0 | 0 | 0 | 0 |
| 39 | Example | 75.42 | 18 | 6 | 0.08 | 0 | 0 | 0 | 0 | 0 | 0 | 0 | 0 | 0 |
| 40 | Example | 75.42 | 18 | 6 | 0.08 | 0 | 0 | 0 | 0 | 0 | 0 | 0 | 0 | 0 |
| 41 | Example | 75.82 | 18 | 6 | 0.08 | 0 | 0 | 0 | 0 | 0 | 0 | 0 | 0 | 0 |
| 42 | Example | 75.82 | 18 | 6 | 0.08 | 0 | 0 | 0 | 0 | 0 | 0 | 0 | 0 | 0 |
| 43 | Example | 75.82 | 18 | 6 | 0.08 | 0 | 0 | 0 | 0 | 0 | 0 | 0 | 0 | 0 |
| 44 | Example | 75.82 | 18 | 6 | 0.08 | 0 | 0 | 0 | 0 | 0 | 0 | 0 | 0 | 0 |

| | plating layer composition (% by mass) | | | | | | | | | | |
|---|---|---|---|---|---|---|---|---|---|---|---|
| No. | Ni | Co | V | Nb | Cu | Mn | Fe | Sr | Sb | Pb | B |
| 1 | 0 | 0 | 0 | 0 | 0 | 0 | 0.1 | 0 | 0 | 0 | 0 |
| 2 | 0 | 0 | 0 | 0 | 0 | 0 | 0.1 | 0 | 0 | 0 | 0 |
| 3 | 0 | 0 | 0 | 0 | 0 | 0 | 0.1 | 0 | 0 | 0 | 0 |
| 4 | 0 | 0 | 0 | 0 | 0 | 0 | 0.1 | 0 | 0 | 0 | 0 |
| 5 | 0 | 0 | 0 | 0 | 0 | 0 | 0.1 | 0 | 0 | 0 | 0 |
| 6 | 0 | 0 | 0 | 0 | 0 | 0 | 0.1 | 0 | 0 | 0 | 0 |
| 7 | 0 | 0 | 0 | 0 | 0 | 0 | 0.1 | 0 | 0 | 0 | 0 |
| 8 | 0 | 0 | 0 | 0 | 0 | 0 | 0.1 | 0 | 0 | 0 | 0 |
| 9 | 0 | 0 | 0 | 0 | 0 | 0 | 0.1 | 0 | 0 | 0 | 0 |
| 10 | 0 | 0 | 0 | 0 | 0 | 0 | 0.1 | 0 | 0 | 0 | 0 |
| 11 | 0 | 0 | 0 | 0 | 0 | 0 | 0.1 | 0 | 0 | 0 | 0 |
| 12 | 0 | 0 | 0 | 0 | 0 | 0 | 0.1 | 0 | 0 | 0 | 0 |
| 13 | 0 | 0 | 0 | 0 | 0 | 0 | 0.1 | 0 | 0 | 0 | 0 |

TABLE 1-continued

| No. | C1 | C2 | C3 | C4 | C5 | C6 | C7 | C8 | C9 | C10 | C11 |
|---|---|---|---|---|---|---|---|---|---|---|---|
| 14 | 0 | 0 | 0 | 0 | 0 | 0 | 0.08 | 0 | 0 | 0 | 0 |
| 15 | 0 | 0 | 0 | 0 | 0 | 0 | 0.1 | 0 | 0 | 0 | 0 |
| 16 | 0 | 0 | 0 | 0 | 0 | 0 | 0.1 | 0 | 0 | 0 | 0 |
| 17 | 0 | 0 | 0 | 0 | 0 | 0 | 0.07 | 0 | 0 | 0 | 0 |
| 18 | 0 | 0 | 0 | 0 | 0 | 0 | 0.1 | 0 | 0 | 0 | 0 |
| 19 | 0 | 0 | 0 | 0 | 0 | 0 | 0.1 | 0 | 0 | 0 | 0 |
| 20 | 0 | 0 | 0 | 0 | 0 | 0 | 0.1 | 0 | 0 | 0 | 0 |
| 21 | 0 | 0 | 0 | 0 | 0 | 0 | 0.1 | 0 | 0 | 0 | 0 |
| 22 | 0 | 0 | 0 | 0 | 0 | 0 | 0.1 | 0 | 0 | 0 | 0 |
| 23 | 0 | 0 | 0 | 0 | 0 | 0 | 0.1 | 0 | 0 | 0 | 0 |
| 24 | 0 | 0 | 0 | 0 | 0 | 0 | 0.1 | 0 | 0 | 0 | 0 |
| 25 | 0 | 0 | 0 | 0 | 0 | 0 | 0.1 | 0 | 0 | 0 | 0 |
| 26 | 0 | 0 | 0 | 0 | 0 | 0 | 0.1 | 0 | 0 | 0 | 0 |
| 27 | 0 | 0 | 0 | 0 | 0 | 0 | 0.1 | 0 | 0 | 0 | 0 |
| 28 | 0 | 0 | 0 | 0 | 0 | 0 | 0.1 | 0 | 0 | 0 | 0 |
| 29 | 0 | 0 | 0 | 0 | 0 | 0 | 0.1 | 0 | 0 | 0 | 0 |
| 30 | 0.2 | 0 | 0 | 0 | 0 | 0 | 0.1 | 0 | 0 | 0 | 0 |
| 31 | 0 | 0.2 | 0 | 0 | 0 | 0 | 0.1 | 0 | 0 | 0 | 0 |
| 32 | 0 | 0 | 0.2 | 0 | 0 | 0 | 0.1 | 0 | 0 | 0 | 0 |
| 33 | 0 | 0 | 0 | 0.2 | 0 | 0 | 0.1 | 0 | 0 | 0 | 0 |
| 34 | 0 | 0 | 0 | 0 | 0.2 | 0 | 0.1 | 0 | 0 | 0 | 0 |
| 35 | 0 | 0 | 0 | 0 | 0 | 0.2 | 0.1 | 0 | 0 | 0 | 0 |
| 36 | 0 | 0 | 0 | 0 | 0 | 0 | 5 | 0 | 0 | 0 | 0 |
| 37 | 0 | 0 | 0 | 0 | 0 | 0 | 0.1 | 0.4 | 0 | 0 | 0 |
| 38 | 0 | 0 | 0 | 0 | 0 | 0 | 0.1 | 0 | 0.4 | 0 | 0 |
| 39 | 0 | 0 | 0 | 0 | 0 | 0 | 0.1 | 0 | 0 | 0.4 | 0 |
| 40 | 0 | 0 | 0 | 0 | 0 | 0 | 0.1 | 0 | 0 | 0 | 0.4 |
| 41 | 0.4 (0.03) | 0 | 0 | 0 | 0 | 0 | 0.1 | 0 | 0 | 0 | 0 |
| 42 | 15 (0.03) | 0 | 0 | 0 | 0 | 0 | 0.1 | 0 | 0 | 0 | 0 |
| 43 | 1 (0.03) | 0 | 0 | 0 | 0 | 0 | 0.1 | 0 | 0 | 0 | 0 |
| 44 | 4 (0.03) | 0 | 0 | 0 | 0 | 0 | 0.1 | 0 | 0 | 0 | 0 |

| No. | category | thickness of Al—Fe alloy layer (μm) | circumferential length of Al crystals (mm/mm$^2$) | area fraction Al crystals (%) | planar surface corrosion resistance | sacrificial corrosion protection ability | process-ability | discoloration resistance | overall evaluation |
|---|---|---|---|---|---|---|---|---|---|
| 1 | Example | 1 | 93 | 10 | A+ | A+ | A− | A+ | A |
| 2 | Example | 1 | 194 | 45 | A | A | A | A+ | A |
| 3 | Example | 1 | 168 | 26 | A+ | A | A | A+ | A |
| 4 | Example | 1 | 163 | 25 | A+ | A | A− | A+ | A |
| 5 | Example | 1 | 165 | 25 | A+ | A | A | A | A |
| 6 | Example | 1 | 162 | 26 | A+ | A | A | A | A |
| 7 | Example | 1 | 158 | 24 | A+ | A+ | A | A | A |
| 8 | Example | 1 | 157 | 23 | A+ | A+ | A | A | A |
| 9 | Example | 1 | 159 | 26 | A+ | A+ | A | A | A |
| 10 | Example | 1 | 163 | 25 | A+ | A+ | A | A+ | A |
| 11 | Example | 1 | 159 | 26 | A+ | A+ | A | A+ | A |
| 12 | Example | 1 | 160 | 25 | A+ | A+ | A | A+ | A |
| 13 | Example | 1 | 156 | 24 | A+ | A+ | A | A+ | A |
| 14 | Example | 1 | 162 | 25 | A+ | A+ | A | A | A |
| 15 | Example | 1 | 159 | 23 | A+ | A+ | A | A | A |
| 16 | Example | 1 | 165 | 26 | A | A+ | A | A | A |
| 17 | Example | 1 | 110 | 18 | A | A+ | A | A | A |
| 18 | Example | 1 | 162 | 23 | A+ | A+ | A | A+ | A |
| 19 | Example | 1 | 163 | 26 | A+ | A+ | A | A+ | A |
| 20 | Example | 1 | 163 | 24 | A+ | A+ | A | A+ | A |
| 21 | Example | 1 | 165 | 27 | A+ | A+ | A | A+ | A |
| 22 | Example | 1 | 160 | 23 | A+ | A+ | A | A+ | A |
| 23 | Example | 1 | 155 | 28 | A | A+ | A− | A+ | A |
| 24 | Example | 1 | 158 | 24 | A+ | A+ | A | A+ | A |
| 25 | Example | 1 | 168 | 23 | A+ | A+ | A | A+ | A |
| 26 | Example | 1 | 170 | 26 | A+ | A+ | A | A+ | A |
| 27 | Example | 1 | 165 | 25 | A | A+ | A− | A+ | A |
| 28 | Example | 1 | 168 | 29 | A+ | A+ | A | A+ | A |
| 29 | Example | 1 | 161 | 28 | A+ | A+ | A | A+ | A |
| 30 | Example | 1 | 162 | 25 | A+ | A+ | A | A+ | A |
| 31 | Example | 1 | 170 | 26 | A+ | A+ | A | A+ | A |
| 32 | Example | 1 | 159 | 27 | A+ | A+ | A | A+ | A |
| 33 | Example | 1 | 165 | 24 | A+ | A+ | A | A+ | A |
| 34 | Example | 1 | 163 | 29 | A+ | A+ | A | A+ | A |
| 35 | Example | 1 | 168 | 26 | A+ | A+ | A | A+ | A |
| 36 | Example | 5 | 164 | 28 | A+ | A+ | A | A+ | A |
| 37 | Example | 1 | 162 | 27 | A+ | A+ | A | A+ | A |
| 38 | Example | 1 | 169 | 25 | A+ | A+ | A | A+ | A |
| 39 | Example | 1 | 167 | 26 | A+ | A+ | A | A+ | A |
| 40 | Example | 1 | 162 | 25 | A+ | A+ | A | A+ | A |
| 41 | Example | 1 | 180 | 26 | A | A+ | A | A+ | A |

TABLE 1-continued

| No. | category | base steel | | | | | | | |
|---|---|---|---|---|---|---|---|---|---|
| 42 | Example | 1 | 160 | 23 | A | A+ | A | A+ | A |
| 43 | Example | 1 | 156 | 26 | A+ | A+ | A | A+ | A |
| 44 | Example | 1 | 159 | 24 | A+ | A+ | A | A+ | A |

TABLE 2

| No. | category | base steel | plating bath melting point (° C.) | plating bath temperature (° C.) | immersion time period (sec) | plating solidification start temperature (° C.) | first stage average cooling rate (° C./s) | second stage average cooling rate (° C./s) | third stage average cooling rate (° C./s) |
|---|---|---|---|---|---|---|---|---|---|
| 45 | Comp. Ex. | — | 480 | 500 | 2 | 460 | 15 | 6 | 15 |
| 46 | Comp. Ex. | — | 380 | 400 | 2 | 360 | 15 | 6 | 15 |
| 47 | Comp. Ex. | — | 470 | 490 | 2 | 450 | 15 | 6 | 15 |
| 48 | Comp. Ex. | — | 450 | 470 | 2 | 430 | 15 | 6 | 15 |
| 49 | Comp. Ex. | — | 470 | 490 | 2 | 450 | 15 | 6 | 15 |
| 50 | Comp. Ex. | — | 460 | 480 | 2 | 440 | 15 | 6 | 15 |
| 51 | Comp. Ex. | — | 460 | 480 | 2 | 440 | 15 | 6 | 15 |
| 52 | Comp. Ex. | — | 460 | 480 | 2 | 440 | 15 | 6 | 15 |
| 53 | Comp. Ex. | — | 460 | 480 | 2 | 440 | 15 | 6 | 15 |
| 54 | Comp. Ex. | — | 460 | 480 | 2 | 440 | 15 | 6 | 15 |
| 55 | Comp. Ex. | — | 460 | 480 | 2 | 440 | 15 | 6 | 15 |
| 56 | Comp. Ex. | — | 460 | 480 | 2 | 440 | 15 | 6 | 15 |
| 57 | Comp. Ex. | — | 470 | 490 | 2 | 450 | 15 | 6 | 15 |
| 58 | Comp. Ex. | — | 460 | 480 | 2 | 440 | 15 | 6 | 15 |
| 59 | Comp. Ex. | — | 460 | 480 | 2 | 440 | 15 | 6 | 15 |
| 60 | Comp. Ex. | — | 460 | 480 | 2 | 440 | 15 | 6 | 15 |
| 61 | Comp. Ex. | — | 460 | 480 | 2 | 440 | 15 | 6 | 15 |
| 62 | Comp. Ex. | — | 460 | 480 | 2 | 440 | 15 | 6 | 15 |
| 63 | Comp. Ex. | — | 460 | 480 | 2 | 440 | 15 | 6 | 15 |
| 64 | Comp. Ex. | — | 460 | 480 | 2 | 440 | 15 | 6 | 15 |
| 65 | Comp. Ex. | — | 460 | 480 | 2 | 440 | 15 | 6 | 15 |
| 66 | Comp. Ex. | — | 460 | 570 | 2 | 440 | 15 | 6 | 15 |
| 67 | Comp. Ex. | — | 460 | 480 | 2 | 440 | 15 | 6 | 15 |
| 68 | Comp. Ex. | — | 460 | 480 | 2 | 440 | 15 | 6 | 15 |
| 69 | Comp. Ex. | — | 460 | 480 | 2 | 440 | 15 | 6 | 15 |
| 70 | Comp. Ex. | — | 460 | 480 | 2 | 440 | 15 | 6 | 15 |
| 71 | Comp. Ex. | — | 460 | 480 | 2 | 440 | 15 | <u>15</u> | 15 |
| 72 | Comp. Ex. | — | 460 | 480 | 2 | 440 | 15 | <u>0.3</u> | 15 |
| 73 | Comp. Ex. | — | 460 | 480 | 2 | 440 | <u>6</u> | 6 | 15 |
| 74 | Comp. Ex. | — | 460 | 480 | 2 | 440 | <u>6</u> | 6 | <u>6</u> |

TABLE 2-continued

| No. | category | plating layer composition (% by mass) | | | | | | | | | | | | |
|---|---|---|---|---|---|---|---|---|---|---|---|---|---|
| | | Zn | Al | Mg | Sn | Bi | In | Ca | Y | La | Ce | Si | Cr | Ti |
| 45 | Comp. Ex. | <u>63.7</u> | 24 | 12 | 0.2 | 0 | 0 | 0 | 0 | 0 | 0 | 0 | 0 | 0 |
| 46 | Comp. Ex. | 89.32 | <u>4.5</u> | 6 | 0.08 | 0 | 0 | 0 | 0 | 0 | 0 | 0 | 0 | 0 |
| 47 | Comp. Ex. | 67.82 | <u>26</u> | 6 | 0.08 | 0 | 0 | 0 | 0 | 0 | 0 | 0 | 0 | 0 |
| 48 | Comp. Ex. | 78.82 | 18 | <u>3</u> | 0.08 | 0 | 0 | 0 | 0 | 0 | 0 | 0 | 0 | 0 |
| 49 | Comp. Ex. | 68.82 | 18 | <u>13</u> | 0.08 | 0 | 0 | 0 | 0 | 0 | 0 | 0 | 0 | 0 |
| 50 | Comp. Ex. | 75.6 | 18 | 6 | <u>0.30</u> | 0 | 0 | 0 | 0 | 0 | 0 | 0 | 0 | 0 |
| 51 | Comp. Ex. | 70.82 | 18 | 6 | 0.08 | <u>5</u> | 0 | 0 | 0 | 0 | 0 | 0 | 0 | 0 |
| 52 | Comp. Ex. | 73.82 | 18 | 6 | 0.08 | 0 | <u>2</u> | 0 | 0 | 0 | 0 | 0 | 0 | 0 |
| 53 | Comp. Ex. | 72.32 | 18 | 6 | 0.08 | 0 | 0 | <u>3.5</u> | 0 | 0 | 0 | 0 | 0 | 0 |
| 54 | Comp. Ex. | 75.22 | 18 | 6 | 0.08 | 0 | 0 | 0 | <u>0.6</u> | 0 | 0 | 0 | 0 | 0 |
| 55 | Comp. Ex. | 75.22 | 18 | 6 | 0.08 | 0 | 0 | 0 | 0 | <u>0.6</u> | 0 | 0 | 0 | 0 |
| 56 | Comp. Ex. | 75.22 | 18 | 6 | 0.08 | 0 | 0 | 0 | 0 | 0 | <u>0.6</u> | 0 | 0 | 0 |
| 57 | Comp. Ex. | 73.12 | 18 | 6 | 0.08 | 0 | 0 | 0 | 0 | 0 | 0 | <u>2.7</u> | 0 | 0 |
| 58 | Comp. Ex. | 75.52 | 18 | 6 | 0.08 | 0 | 0 | 0 | 0 | 0 | 0 | 0 | <u>0.3</u> | 0 |
| 59 | Comp. Ex. | 75.52 | 18 | 6 | 0.08 | 0 | 0 | 0 | 0 | 0 | 0 | 0 | 0 | <u>0.3</u> |
| 60 | Comp. Ex. | 75.52 | 18 | 6 | 0.08 | 0 | 0 | 0 | 0 | 0 | 0 | 0 | 0 | 0 |
| 61 | Comp. Ex. | 75.52 | 18 | 6 | 0.08 | 0 | 0 | 0 | 0 | 0 | 0 | 0 | 0 | 0 |
| 62 | Comp. Ex. | 75.52 | 18 | 6 | 0.08 | 0 | 0 | 0 | 0 | 0 | 0 | 0 | 0 | 0 |
| 63 | Comp. Ex. | 75.52 | 18 | 6 | 0.08 | 0 | 0 | 0 | 0 | 0 | 0 | 0 | 0 | 0 |
| 64 | Comp. Ex. | 75.52 | 18 | 6 | 0.08 | 0 | 0 | 0 | 0 | 0 | 0 | 0 | 0 | 0 |
| 65 | Comp. Ex. | 75.52 | 18 | 6 | 0.08 | 0 | 0 | 0 | 0 | 0 | 0 | 0 | 0 | 0 |
| 66 | Comp. Ex. | 68.92 | 18 | 6 | 0.08 | 0 | 0 | 0 | 0 | 0 | 0 | 0 | 0 | 0 |
| 67 | Comp. Ex. | 75.32 | 18 | 6 | 0.08 | 0 | 0 | 0 | 0 | 0 | 0 | 0 | 0 | 0 |
| 68 | Comp. Ex. | 75.32 | 18 | 6 | 0.08 | 0 | 0 | 0 | 0 | 0 | 0 | 0 | 0 | 0 |
| 69 | Comp. Ex. | 75.32 | 18 | 6 | 0.08 | 0 | 0 | 0 | 0 | 0 | 0 | 0 | 0 | 0 |
| 70 | Comp. Ex. | 75.22 | 18 | 6 | 0.08 | 0 | 0 | 0 | 0 | 0 | 0 | 0 | 0 | 0 |
| 71 | Comp. Ex. | 75.82 | 18 | 6 | 0.08 | 0 | 0 | 0 | 0 | 0 | 0 | 0 | 0 | 0 |
| 72 | Comp. Ex. | 75.82 | 18 | 6 | 0.08 | 0 | 0 | 0 | 0 | 0 | 0 | 0 | 0 | 0 |
| 73 | Comp. Ex. | 75.82 | 18 | 6 | 0.08 | 0 | 0 | 0 | 0 | 0 | 0 | 0 | 0 | 0 |
| 74 | Comp. Ex. | 75.82 | 18 | 6 | 0.08 | 0 | 0 | 0 | 0 | 0 | 0 | 0 | 0 | 0 |

| | plating layer composition (% by mass) | | | | | | | | | | |
|---|---|---|---|---|---|---|---|---|---|---|---|
| No. | Ni | Co | V | Nb | Cu | Mn | Fe | Sr | Sb | Pb | B |
| 45 | 0 | 0 | 0 | 0 | 0 | 0 | 0.1 | 0 | 0 | 0 | 0 |
| 46 | 0 | 0 | 0 | 0 | 0 | 0 | 0.1 | 0 | 0 | 0 | 0 |
| 47 | 0 | 0 | 0 | 0 | 0 | 0 | 0.1 | 0 | 0 | 0 | 0 |
| 48 | 0 | 0 | 0 | 0 | 0 | 0 | 0.1 | 0 | 0 | 0 | 0 |
| 49 | 0 | 0 | 0 | 0 | 0 | 0 | 0.1 | 0 | 0 | 0 | 0 |
| 50 | 0 | 0 | 0 | 0 | 0 | 0 | 0.1 | 0 | 0 | 0 | 0 |
| 51 | 0 | 0 | 0 | 0 | 0 | 0 | 0.1 | 0 | 0 | 0 | 0 |
| 52 | 0 | 0 | 0 | 0 | 0 | 0 | 0.1 | 0 | 0 | 0 | 0 |
| 53 | 0 | 0 | 0 | 0 | 0 | 0 | 0.1 | 0 | 0 | 0 | 0 |
| 54 | 0 | 0 | 0 | 0 | 0 | 0 | 0.1 | 0 | 0 | 0 | 0 |
| 55 | 0 | 0 | 0 | 0 | 0 | 0 | 0.1 | 0 | 0 | 0 | 0 |

TABLE 2-continued

|  |  |  |  |  |  |  |  |  |  |  |  |  |
|---|---|---|---|---|---|---|---|---|---|---|---|---|
| 56 | 0 | 0 | 0 | 0 | 0 | 0 | 0 | 0.1 | 0 | 0 | 0 | 0 |
| 57 | 0 | 0 | 0 | 0 | 0 | 0 | 0 | 0.1 | 0 | 0 | 0 | 0 |
| 58 | 0 | 0 | 0 | 0 | 0 | 0 | 0 | 0.1 | 0 | 0 | 0 | 0 |
| 59 | 0 | 0 | 0 | 0 | 0 | 0 | 0 | 0.1 | 0 | 0 | 0 | 0 |
| 60 | <u>0.3</u> | 0 | 0 | 0 | 0 | 0 | 0 | 0.1 | 0 | 0 | 0 | 0 |
| 61 | 0 | <u>0.3</u> | 0 | 0 | 0 | 0 | 0 | 0.1 | 0 | 0 | 0 | 0 |
| 62 | 0 | 0 | <u>0.3</u> | 0 | 0 | 0 | 0 | 0.1 | 0 | 0 | 0 | 0 |
| 63 | 0 | 0 | 0 | <u>0.3</u> | 0 | 0 | 0 | 0.1 | 0 | 0 | 0 | 0 |
| 64 | 0 | 0 | 0 | 0 | <u>0.3</u> | 0 | 0 | 0.1 | 0 | 0 | 0 | 0 |
| 65 | 0 | 0 | 0 | 0 | 0 | <u>0.3</u> | 0 | 0.1 | 0 | 0 | 0 | 0 |
| 66 | 0 | 0 | 0 | 0 | 0 | 0 | 0 | <u>7</u> | 0 | 0 | 0 | 0 |
| 67 | 0 | 0 | 0 | 0 | 0 | 0 | 0 | 0 | <u>0.6</u> | 0 | 0 | 0 |
| 68 | 0 | 0 | 0 | 0 | 0 | 0 | 0 | 0 | 0 | <u>0.6</u> | 0 | 0 |
| 69 | 0 | 0 | 0 | 0 | 0 | 0 | 0 | 0 | 0 | 0 | <u>0.6</u> | 0 |
| 70 | 0 | 0 | 0 | 0 | 0 | 0 | 0 | 0.1 | 0 | 0 | 0 | <u>0.6</u> |
| 71 | 0 | 0 | 0 | 0 | 0 | 0 | 0 | 0.1 | 0 | 0 | 0 | 0 |
| 72 | 0 | 0 | 0 | 0 | 0 | 0 | 0 | 0.1 | 0 | 0 | 0 | 0 |
| 73 | 0 | 0 | 0 | 0 | 0 | 0 | 0 | 0.1 | 0 | 0 | 0 | 0 |
| 74 | 0 | 0 | 0 | 0 | 0 | 0 | 0 | 0.1 | 0 | 0 | 0 | 0 |

| No. | category | thickness of Al—Fe alloy layer (μm) | circumferential length of Al crystals (mm/mm$^2$) | area fraction Al crystals (%) | planar surface corrosion resistance | sacrificial corrosion protection ability | process-ability | discoloration resistance | overall evaluation |
|---|---|---|---|---|---|---|---|---|---|
| 45 | Comp. Ex. | 1 | 190 | 40 | A | NG | A | A | NG |
| 46 | Comp. Ex. | 1 | 92 | 2 | NG | A+ | A | A+ | NG |
| 47 | Comp. Ex. | 1 | 191 | 48 | A | NG | A | A+ | NG |
| 48 | Comp. Ex. | 1 | 172 | 26 | NG | A+ | A | A+ | NG |
| 49 | Comp. Ex. | 1 | 175 | 23 | A+ | A+ | NG | A+ | NG |
| 50 | Comp. Ex. | 1 | 163 | 25 | A+ | A+ | A | NG | NG |
| 51 | Comp. Ex. | 1 | 165 | 24 | NG | A+ | A | A+ | NG |
| 52 | Comp. Ex. | 1 | 168 | 26 | NG | A+ | A | A+ | NG |
| 53 | Comp. Ex. | 1 | 158 | 28 | NG | A+ | NG | A+ | NG |
| 54 | Comp. Ex. | 1 | 163 | 29 | NG | A+ | A | A+ | NG |
| 55 | Comp. Ex. | 1 | 155 | 26 | NG | A+ | A | A+ | NG |
| 56 | Comp. Ex. | 1 | 165 | 24 | NG | A+ | A | A+ | NG |
| 57 | Comp. Ex. | 1 | 161 | 28 | NG | A+ | NG | A+ | NG |
| 58 | Comp. Ex. | 1 | 162 | 27 | NG | A+ | A | A+ | NG |
| 59 | Comp. Ex. | 1 | 167 | 25 | NG | A+ | A | A+ | NG |
| 60 | Comp. Ex. | 1 | 166 | 26 | NG | A+ | A | A+ | NG |
| 61 | Comp. Ex. | 1 | 169 | 24 | NG | A+ | A | A+ | NG |
| 62 | Comp. Ex. | 1 | 160 | 28 | NG | A+ | A | A+ | NG |
| 63 | Comp. Ex. | 1 | 158 | 25 | NG | A+ | A | A+ | NG |
| 64 | Comp. Ex. | 1 | 170 | 27 | NG | A+ | A | A+ | NG |
| 65 | Comp. Ex. | 1 | 175 | 29 | NG | A+ | A | A+ | NG |
| 66 | Comp. Ex. | 8 | 149 | 24 | A | A+ | NG | A+ | NG |
| 67 | Comp. Ex. | 1 | 153 | 28 | NG | A+ | A | A+ | NG |
| 68 | Comp. Ex. | 1 | 158 | 29 | NG | A+ | A | A+ | NG |
| 69 | Comp. Ex. | 1 | 156 | 26 | NG | A+ | A | A+ | NG |
| 70 | Comp. Ex. | 1 | 160 | 24 | NG | A+ | A | A+ | NG |
| 71 | Comp. Ex. | 1 | <u>210</u> | 25 | NG | A+ | A | A+ | NG |

TABLE 2-continued

| 72 | Comp. Ex. | 2 | <u>80</u> | 25 | A+ | A+ | NG | A+ | NG |
| 73 | Comp. Ex. | 2 | <u>79</u> | 24 | A+ | A+ | NG | A+ | NG |
| 74 | Comp. Ex. | 2 | <u>83</u> | 24 | A+ | A+ | NG | A+ | NG |

From the above results, it can be understood that the Examples corresponding to the coated steel material of the present disclosure have stable planar surface corrosion resistance as compared with the Comparative Examples.

In particular, it can be understood that the Comparative Example (Test No. 50) in which the Sn concentration was greater than 0.2% has poor discoloration resistance.

Further, it can be understood that, in the Comparative Example (Test No. 71) in which, even though the chemical composition of the coating layer of the present disclosure was satisfied, the average cooling rate was 15° C./s and was not changed, the average value of the cumulative circumferential length of the Al crystals is excessively large, and stable planar surface corrosion resistance is not obtained.

On the other hand, it can be understood that, in the Comparative Example (Test No. 72) in which the average cooling rate of the second stage was excessively low, the Comparative Example (Test No. 73) in which the average cooling rate was only changed in the second stage, and the Comparative Example (Test No. 74) in which the average cooling rate was 6° C./sec and was not changed, the average value of the cumulative circumferential length of the Al crystals is excessively low, and the processability deteriorates.

Note that the Ni concentrations of the coating layers of the Examples (Test Nos. 41 to 44) that used an Ni pre-coated steel sheet correspond to examples in which the Ni concentration of the coating layer is considered to be 0%, because the Ni concentration detected by ICP analysis is greater than 0.28% and is 15% or less.

Preferred embodiments of the present disclosure have been described herein in detail with reference to the accompanying drawings. However, the present disclosure is not limited to these examples. It is clear that those having ordinary skill in the technological field to which the present disclosure belongs can conceive of changed examples or modified examples within the scope of the technical concepts described in the claims, and it should be understood that these, of course, also fall within the technical scope of the present disclosure.

Explanation of the reference symbols is as follows.
Al: Al crystals
Zn—Al: Zn—Al phase
$MgZn_2$: $MgZn_2$ phase
Zn—Eu: Zn-based eutectic phase The disclosure of Japanese Patent Application No. 2019-205998 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A coated steel material comprising a base steel, and a coating layer containing a Zn—Al—Mg alloy layer disposed on a surface of the base steel,
wherein the coating layer has a chemical composition formed from, in % by mass:
Zn: greater than 65.0%,
Al: greater than 5.0% to less than 25.0%,
Mg: greater than 3.0% to less than 12.5%,
Sn: 0 to 0.20%,
Bi: 0% to less than 5.0%,
In: 0% to less than 2.0%,
Ca: 0% to 3.0%,
Y: 0% to 0.5%,
La: 0% to less than 0.5%,
Ce: 0% to less than 0.5%,
Si: 0% to less than 2.5%,
Cr: 0% to 0.25%,
Ti: 0% to 0.25%,
Ni: 0% to 0.25%,
Co: 0% to 0.25%,
V: 0% to 0.25%,
Nb: 0% to 0.25%,
Cu: 0% to 0.25%,
Mn: 0% to 0.25%,
Fe: 0% to 5.0%,
Sr: 0% to less than 0.5%,
Sb: 0% to less than 0.5%,
Pb: 0% to less than 0.5%,
B: 0% to less than 0.5%, and
impurities, and
wherein, in a backscattered electron image of the Zn—Al—Mg alloy layer that is obtained at a time of observing a surface of the Zn—Al—Mg alloy layer, after polishing the Zn—Al—Mg alloy layer such that a layer thickness thereof is reduced by one-half, under a scanning electron microscope at a magnification of 100×, Al crystals are present, and an average value of a cumulative circumferential length of the Al crystals, as determined by binarization image processing and shape characterization measurement, is 88 to 195 $mm/mm^2$.

2. The coated steel material of claim 1, wherein a content of the Sn is 0 to less than 0.10%, in % by mass.

3. The coated steel material of claim 2, wherein the coating layer has an Al—Fe alloy layer of a thickness of 0.05 to 5 µm, between the base steel and the Zn—Al—Mg alloy layer.

4. The coated steel material of claim 1, wherein the coating layer has an Al—Fe alloy layer of a thickness of 0.05 to 5 µm, between the base steel and the Zn—Al—Mg alloy layer.

* * * * *